United States Patent [19]
Morioka et al.

[11] Patent Number: 5,995,949
[45] Date of Patent: Nov. 30, 1999

[54] AUTOMATED TRANSACTION APPARATUS

[75] Inventors: Makoto Morioka; Tomotaka Suzuki; Takuji Shiota, all of Kawasaki, Japan

[73] Assignee: Fujitsu Limited, Kawasaki, Japan

[21] Appl. No.: 08/424,191

[22] Filed: Apr. 19, 1995

[30] Foreign Application Priority Data

Apr. 22, 1994 [JP] Japan .................................. 6-084847

[51] Int. Cl.⁶ ............................................. G06F 17/60
[52] U.S. Cl. ........................................................ 705/43
[58] Field of Search ........................... 364/401 R, 408; 395/155, 156, 157, 160, 161, 235, 239, 242, 243, 338; 345/112, 157, 185, 352–356, 357, 338, 336, 337; 235/379, 380, 381; 705/35, 39, 42, 43

[56] References Cited

U.S. PATENT DOCUMENTS

| | | | |
|---|---|---|---|
| 4,804,830 | 2/1989 | Miyagisima et al. | 235/379 |
| 5,021,639 | 6/1991 | Hara et al. | 235/379 |
| 5,101,197 | 3/1992 | Hix | 345/185 |
| 5,251,292 | 10/1993 | Martel | 395/167 |
| 5,287,448 | 2/1994 | Nicol et al. | 345/338 |
| 5,396,443 | 3/1995 | Mese | 364/707 |
| 5,450,539 | 9/1995 | Ruben | 345/354 |
| 5,526,011 | 6/1996 | Hix | 345/157 |
| 5,553,226 | 9/1996 | Kiuchi | 395/161 |

FOREIGN PATENT DOCUMENTS

| | | |
|---|---|---|
| 1-94476 | 4/1989 | Japan . |
| 3-260894 | 11/1991 | Japan . |
| 5-101255 | 4/1993 | Japan . |

OTHER PUBLICATIONS

Patent Abstracts of Japan, JP6084049, published Mar. 24, 1994, vol. 18, No. 346, H. Ogasaka.

Patent Abstracts of Japan, JP3148794, published Jun. 25, 1991, vol. 15, No. 380, M. Yamamoto.

Patent Abstracts of Japan, JP3063873, published Mar. 19, 1991, vol. 15, No. 224, H. Takane.

Primary Examiner—Vijay Shankar
Attorney, Agent, or Firm—Staas & Halsey, LLP

[57] ABSTRACT

A process controller controls the information display of a display device and performs a transaction procedure based on the information input from the input device via the input controller. The process controller has a group display unit. The group display unit previously groups display information to the screen of the display device based on an input made by a user via the input device and the internal state of the process controller for each associative information, and displays the display information on the screen of the display device group by group in a systematically organized form. The state of a transfer procedures is displayed by three general groups affixed with, for example, tabs, and an input format in the style of the image of a slip. This allows the user to easily grasp the operation state during operation and also presents a friendlier input style to the user.

3 Claims, 19 Drawing Sheets

```
PLEASE CHECK DISPLAYED              RETURN TO
INFORMATION AND PRESS "OK"          FIRST SCREEN

DEPOSIT
  ACCOUNT              NAME
       SAVINGS 123123       WILLIAM JONES
  INSERTING AMOUNT
       $ 550.00

INSERT
                                     AGAIN
   PRESS WHEN INSERTING BILLS AND/OR
   COINS AGAIN

PLEASE SPECIFY AMOUNT | RETURN TO FIRST SCREEN

WITHDRAW

ACCOUNT          NAME
  SAVINGS 123123      WILLIAM JONES
WITHDRAWING AMOUNT   CHARGE
  $                    $

[7] [8] [9]
[4] [5] [6]
[1] [2] [3]
[0] [000] [.]

CORRECT
$50
$100
$500
$

FIG. 16

PLEASE CHECK AMOUNT | RETURN TO FIRST SCREEN

WITHDRAW

ACCOUNT          NAME
  SAVINGS 123123      WILLIAM JONES
WITHDRAWING AMOUNT   CHARGE
  $550.00              $1.03

CORRECT

CHANGE $100 BILL TO $1 BILLS

CHANGE $100

```
PLEASE SELECT TRANSFER METHOD        | RETURN TO
                                     | FIRST SCREEN

PAYEE
1   FINANCIAL INSTITUTION    BRANCH NAME
    NAME

ACCOUNT/ACCOUNT NO.    NAME

2
    WHEN NEWLY SPECIFY          SPECIFY
    PAYEE/PAYER                 NEW ONE

USE TRANSFER
                                CARD
3
```

FIG. 18

```
PLEASE SELECT FINANCIAL        | RETURN TO
INSTITUTION                    | FIRST SCREEN

PREVIOUS
  PAYEE                          SCREEN
1   FINANCIAL INSTITUTION    BRANCH NAME
    NAME

ACCOUNT/ACCOUNT NO.    NAME

2   THIS OFFICE      BANK E
    OTHER OFFICE     BANK F
    OF THIS BANK     BANK G
      BANK A         BANK H        OTHER
3     BANK B         BANK I
      BANK C         BANK J
      BANK D
```

FIG. 19

PLEASE SELECT FIRST LETTER | RETURN TO FIRST SCREEN

PAYEE | PREVIOUS SCREEN

1. FINANCIAL INSTITUTION NAME    BRANCH NAME
   BANK B                         M
   ACCOUNT/ACCOUNT NO.   NAME

2.
| A | B | C | D | E | F | G | 7 | 8 | 9 |
| H | I | J | K | L | M | N | 4 | 5 | 6 |
| O | P | Q | R | S | T | U | 1 | 2 | 3 |
| V | W | X | Y | Z | : | ; | 0 |   |   |
| , | . | ' | · | & | / | − |   |   |   |

3. BLANK
SPECIFY BRANCH NO.

FIG. 20

PLEASE SELECT BRANCH NAME | RETURN TO FIRST SCREEN

PAYEE | PREVIOUS SCREEN

1. FINANCIAL INSTITUTION NAME    BRANCH NAME
   BANK B                         M
   ACCOUNT/ACCOUNT NO.   NAME

2. MADISON
   MASSACHUSETTS
   MINNEAPOLIS
   MILWAUKEE
3. MONTPELIER
   MONTGOMERY

FIG. 21

```
PLEASE SELECT ACCOUNT              | RETURN TO
                                   | FIRST SCREEN
                                   | PREVIOUS
         PAYEE                     | SCREEN
 1   FINANCIAL INSTITUTION    BRANCH NAME
     NAME
              BANK B                  MILWAUKEE
     ACCOUNT/ACCOUNT NO.    NAME

2
                    [ SAVINGS ]

3                  [ CHECKING ]
```

FIG. 22

```
PLEASE SPECIFY ACCOUNT NO.         | RETURN TO
                                   | FIRST SCREEN
                                   | PREVIOUS
         PAYEE                     | SCREEN
 1   FINANCIAL INSTITUTION    BRANCH NAME
     NAME
              BANK B                  MILWAUKEE
     ACCOUNT/ACCOUNT NO.    NAME
           SAVINGS  1 2 3 ■

2            [7] [8] [9]

[4] [5] [6]

3            [1] [2] [3]     [ CORRECT ]

PLEASE SPECIFY PAYEE | RETURN TO FIRST SCREEN

PAYEE | PREVIOUS SCREEN

1

FINANCIAL INSTITUTION NAME      BRANCH NAME
         BANK B                      M
ACCOUNT/ACCOUNT NO.     NAME
         SAVINGS 123456        MARY JONES ■

2

| A | B | C | D | E | F | G | 7 | 8 | 9 |
| H | I | J | K | L | M | N | 4 | 5 | 6 |
| O | P | Q | R | S | T | U | 1 | 2 | 3 |
| V | W | X | Y | Z | : | ; | 0 |   |   |
| , | . | ' | • | & | / | — |   |   |   |

3

BLANK | CORRECT ONE CHARACTER | CORRECT

LTD | CO | OTHER COMPANY TYPE | | OK

FIG. 24

PLEASE SPECIFY TRANSFER METHOD | RETURN TO FIRST SCREEN

TRANSFER AMOUNT | PREVIOUS SCREEN

1

TRANSFER METHOD
      [FROM ACCOUNT, CASH]
AMOUNT        CHARGE        TOTAL

2

TRANSFERABLE FROM YOUR ACCOUNT WITH CARD → TRANSFER FROM ACCOUNT

TRANSFER BY CASH

```
PLEASE ENTER TRANSFER AMOUNT        | RETURN TO FIRST SCREEN |

TRANSFER AMOUNT                  | PREVIOUS SCREEN |
1   TRANSFER ACCOUNT    NAME
        SAVINGS 123123         WILLIAM JONES
    AMOUNT      CHARGE      TOTAL
        $550. ■

2           [7] [8] [9]
            [4] [5] [6]
3           [1] [2] [3]          | CORRECT |
            [0] [000] [.]        |   $     |
```

FIG. 28

```
PLEASE CHECK DISPLAYED              | RETURN TO FIRST SCREEN |
INFORMATION

PAYEE
1   FINANCIAL INSTITUTION NAME   | BRANCH NAME
           BANK B                |      MILWAUKEE
    ACCOUNT/ACCOUNT NO.          | NAME
           SAVINGS 123456        |      MARY JONES

TRANSFER AMOUNT
2   TRANSFER ACCOUNT    NAME
        SAVINGS 123123         WILLIAM JONES
    AMOUNT       CHARGE      TOTAL
     $550.00      $3.09       $553.09

PAYER
    NAME  WILLIAM JONES     | TEL
3         INDUSTRY          |    03-4567-8910

| OK |
```

AUTOMATED TRANSACTION APPARATUS

BACKGROUND OF THE INVENTION

1. Field of the Invention

The present invention relates to an automated transaction apparatus called an ATM (Automatic Teller Machine), a CD (Cash Dispenser), an automatic remitter or a bond issuing machine, and more particularly, to an improvement on the operability of transactions in an automated transaction apparatus.

2. Description of the Related Art

Recently, an automated transaction apparatus like an ATM for financial institutions, such as banks, which can ensure transactions without requiring a bank employee like a teller, has been developed and used. This automated transaction apparatus allows a customer or a user to perform an operation, such as the inputting of information, in an interactive manner while viewing what is shown on the display screen of the apparatus, thereby accomplishing the desired transaction.

As one way to interact with a user, the conventional automated transaction apparatus displays, for example, guidance messages on the screen of its display device one after another to request the user to input or select information, or request the user of another operation. In accordance with the guidance or the like on the display screen, the user performs an operation, like inputting information, to make an transaction.

The operation procedure for a transaction requires the inputting of various pieces of information.

According to the conventional transaction screen, a maximum of several items can be input but it is difficult to display all the items necessary for different transactions on one screen and permit a user to select a desired item from them. For the user to complete a transaction procedure such as a transfer procedure, different pieces of information should be input step by step while switching many screens from one to another.

This input system does not allow users to know the time-sequential states of the operation procedures to reach the last screen for the confirmation of the entered information. Therefore, the users cannot grasp, midway of the transaction procedure, when the input procedure will end or where in the entire procedure the current process is located, and cannot know the end of the operation until the very end at which the last screen for the confirmation of the entered information actually appears. This was one factor to irritate and worry the users about the currently performing operation.

In inserting or removing a passbook, a card, a transfer card and some cashes to or from an automated transaction apparatus, after information is input or selected, users were requested to perform the consequent operation by the guiding flickering of lamps provided near the slots of the respective media, or were given a voice guidance to perform the operation. Some automated transaction apparatuses display a simple illustration to vaguely indicate how to insert a card or a passbook at the time of requesting the insertion of the card or passbook. In this case, the given information is not detailed and its association with the apparatus is unclear, making it difficult for users to grasp what should be inserted where in the apparatus.

From the viewpoint of improving services to users, it is important to take some measure against the user's leaving the place of the apparatus without removing the inserted medium. With regard to this probable unintentional leaving of an inserted medium, the executives who run banks or the like are demanded to take the proper measure against such an event from the viewpoints of shortening the working time and also of the systemized system.

As the conventional measures against the probable left-out of a medium, users are informed of the event by the flickering of an alarm lamp or a voice guidance. However, no specific measure has been taken with respect to information displayed on the display screen, which provides the direct interaction with users and which is what each user keeps watching during operation.

Further, the contents of guidance messages in the conventional automated transaction apparatuses are fixed. For example, if all the guidances for the individual operations and guidances for what should be performed on the screen are displayed on a single screen, those guidances are not easy for users to see and, what is more, it is likely for the users to take a considerable time to check the contents of the individual guidances. The conventional guidances to be displayed are therefore simplified by omitting the explanation of what to do, the explanation of the individual button operations and the like.

As the amount of transactions is increased and the number of users who use automated transaction apparatuses is also increased, there is an increasing demand for easier understandable operations for transaction procedures and an improved operability.

More specifically, it is desirable if those users can see many information items to be input on the screen and can easily understand for which item the operation should be performed currently, what has already been input and what operations should be performed yet to complete the intended transaction procedure.

It is difficult to grasp the correlation between the contents of each slip users used to fill in at the time of executing a transaction such as a transfer, and the associated operations the users should perform with an automated transaction apparatus, so that some users feel the machine operations more troublesome than filling a slip.

Further, it is necessary to perform operations, such as the removal a passbook, a card or some cashes, other than information input through the screen as well as the interactive operations for entering information through the ordinary screen. In this case, users want easier operation displays which can ensure smooth transition from the screen of simple input operations to another operation like the insertion of media, such as a card and a passbook.

It is not a very rare occasion that users forget to remove their passbooks, cards, bonds or other media, so that some proper measures should be taken to prevent users from forgetting the removal of the media.

It is further desirable to design clear and understandable displays to assist the users' operations, such as guidance displays, so that even those who are not well acquainted with the interactive operations.

SUMMARY OF THE INVENTION

Accordingly, it is an object of the present invention to provide an automated transaction apparatus which can facilitate transaction operations for the improved operability, and can present better services to users.

An automated transaction apparatus according to this invention comprises a display device for displaying information, an input device for inputting information associated with a transaction, and a process controller for controlling information display by the display device and executing a transaction procedure based on the information input from the input device in association with the information display. The process controller is designed to further facilitate operations of transaction procedures and improve the operability by presenting improved display contents and display styles.

The automated transaction apparatus embodying this invention comprises the display device, the input device, a central processing section and a media processor.

The display device displays information. The input device inputs information about a transaction. The media processor handles media, such as a magnetic card, a passbook, a slip and cashes.

The central processing section includes, for example, an input controller, a CG (Character Generator) unit, an image data holding unit and a process controller.

The input controller controls the input device for the entry of information. The CG unit has a character generator constituted of, for example, a ROM (Read Only Memory). The CG unit has character patterns necessary for the information display stored in the character generator, and generates character data forming display information such as a message displayed on the display device. Multiple pieces of image data for forming display screens to be displayed on the display device are stored previously in the image data holding unit, so that desired image data is read from the image data holding unit and is displayed, as needed. This image data may be displayed in combination with a character pattern generated by the CG unit as needed.

The process controller controls the information display of the display device and performs a transaction procedure based on the information input from the input device via the input controller. The process controller has at least one of a group display unit, a state display unit, an instruction display unit and a description display unit, for example.

An automated transaction apparatus according to a first aspect of this invention comprises a display device, an input device, and a process controller, which has a group display unit. The group display unit previously groups display information to the screen of the display device based on an input made by a user via the input device and the internal state of the process controller for each associative information (pieces of information associated with one another), and displays the display information on the screen of the display device group by group in a systematically organized form. As a specific example of the systematic organization of the grouped display information for each associative information, the current state under operation is displayed based on the general classification of display information using, for example, tabs, and the image-oriented input format matching with the layout of an actual slip.

In an automated transaction apparatus according to a second aspect of this invention, the process controller of the automated transaction apparatus according to the first aspect further has a state display unit. The state display unit previously displays all input items for the screen and item input areas associated with the input items, as display information to the screen of the display device based on an input made by a user via the input device and the internal state of the process controller, and displays input results from the input device one after another in the item input areas.

An automated transaction apparatus according to a third aspect of this invention comprises a display device, an input device, and a process controller, which has a state display unit. The state display unit previously displays all input items for the screen and item input areas associated with the input items, as display information to the screen of the display device based on an input made by a user via the input device and the internal state of the process controller, and displays input results from the input device one after another in the item input areas.

An automated transaction apparatus according to a fourth aspect of this invention comprises a display device, an input device, and a process controller, which has an instruction display unit. The instruction display unit displays instruction information to request an operation on the screen of the display device in association with mode information of a hardware portion to be operated, e.g., the media processor, based on the internal state of the process controller.

In an automated transaction apparatus according to a fifth aspect of this invention, the instruction display unit of the automated transaction apparatus according to the fourth aspect also displays instruction information to request operations for all pieces of information to be manipulated now, on the screen of the display device in association with mode information of a hardware portion to be operated, and alters portions corresponding to results of display operations indicated by the instruction information, one after another, in cooperation with the hardware.

In an automated transaction apparatus according to a sixth aspect of this invention, the instruction display unit of the automated transaction apparatus according to the fifth aspect further also erases portions corresponding to results of display operations indicated by the instruction information, one after another, to alter display information to be displayed.

An automated transaction apparatus according to a seventh aspect of this invention comprises a display device, an input device, and a process controller, which has a description display unit. Based on the internal state of the process controller, the description display unit presents a more detailed descriptive display of a content of an operation available at a time when a user has made no operation for a previously-set predetermined time, in association with at least a part of the display information of the content of the available operation.

In an automated transaction apparatus according to an eighth aspect of this invention, the description display unit of the automated transaction apparatus according to the seventh aspect also sets a plurality of detail levels for the descriptive display and presents the descriptive display by increasing the detail level one by one upon every passage of the predetermined time in a continuous non-operation time.

An automated transaction apparatus according to a ninth aspect of this invention comprises a display device, an input device, and a process controller, which has a group display unit, a state display unit, an instruction display unit and a description display unit. The group display unit previously groups display information to the screen of the display device based on an input made by a user via the input device and the internal state of the process controller for each associative information, and displays the display information on the screen of the display device group by group in a systematically organized form. The state display unit previously displays all input items for the screen and item input areas associated with the input items, as display information to the screen of the display device based on an input made by a user via the input device and the internal state of the process controller, and displays input results from the input device one after another in the item input areas. The instruction display unit displays instruction information to request operations for all pieces of information to be manipulated now, on the screen of the display device in association with mode information of a hardware portion to be operated, and alters portions corresponding to results of display operations indicated by the instruction information, one after another, in cooperation with the hardware. Based on the internal state of the process controller, the description display unit presents a more detailed descriptive display of a content of an operation available at a time when a user has made no operation for a previously-set predetermined time, in association with at least a part of the display information of the content of the available operation.

According to the automated transaction apparatus embodying this invention, the process controller controls the information display of the display device, and performs a transaction procedure based on information input from the input device via the input controller in association with the information display.

In the above-described automated transaction apparatus according to the first aspect of this invention, the process controller causes the group display unit to previously group display information to the screen of the display device based on an input made by a user via the input device and the internal state of the process controller for each associative information, and to display the display information on the screen of the display device group by group in a systematically organized form.

Accordingly, the display information are systematically grouped for each associative information, thus permitting users to easily grasp the operation state during the transaction procedure, so that the input style becomes easier and friendlier to the users.

In the above-described automated transaction apparatus according to the second aspect of this invention, the process controller of the automated transaction apparatus according to the first aspect further causes the state display unit to previously display all input items and item input areas associated with the input items, as display information to the screen of the display device, and to display input results from the input device one after another in the item input areas.

Accordingly, after the display information are systematically grouped for each associative information, all the input items to be input, their item input areas and already-input information are displayed on the screen, so that users can very easily grasp what should be input from now on and the current input situation.

In the above-described automated transaction apparatus according to the third aspect of this invention, the process controller causes the state display unit to previously display all input items and item input areas associated with the input items, as display information to the screen of the display device, and to display input results from the input device one after another in the item input areas.

Since all the input items to be input, their item input areas and already-input information are displayed on the screen, users can very easily and properly grasp what should be input from now on and the current input situation.

In the above-described automated transaction apparatus according to the fourth aspect of this invention, the process controller causes the instruction display unit to display instruction information to request an operation on the screen of the display device in association with mode information of a hardware portion to be operated.

As what operations should be performed thereafter is displayed on the screen, even users who have are not so certain about the subsequent operations can perform the operations properly.

In the above-described automated transaction apparatus according to the fifth aspect of this invention, the instruction display unit of the automated transaction apparatus according to the fourth aspect displays instruction information to request operations for all pieces of information to be manipulated now, on the screen of the display device, at the time of displaying the instruction information in association with mode information of a hardware portion to be operated, and alters portions corresponding to results of display operations indicated by the instruction information, one after another, in cooperation with the hardware.

Since a plurality of operations to follow are displayed on the screen and the display state changes in accordance with the operations performed, an operator or a user can surely perform the proper operations while grasping the situation.

In the automated transaction apparatus according to the sixth aspect of this invention, the instruction display unit of the automated transaction apparatus according to the fifth aspect erases portions of the instruction information, displayed on the screen of the display device to request operations for all pieces of information to be manipulated now, which correspond to the results of display operations indicated by the instruction information, one after another, in cooperation with the hardware.

Since a plurality of operations to follow are displayed on the screen and instruction information which becomes unnecessary in accordance with the operations performed is erased and only the necessary instruction information is displayed, users can properly perform the operations while grasping the situation.

In the above-described automated transaction apparatus according to the seventh aspect of this invention, the process controller causes the description display unit to present, based on the internal state of the process controller, a more detailed descriptive display of the content of an operation available at a time when a user has made no operation for a predetermined time, in association with at least a part of the display information of the content of the available operation.

Since detailed descriptions on the contents to be manipulated are displayed on the display screen when a user who is not well acquainted with the subsequent operations makes no operation for a predetermined time, it is possible to present better guidance displays with the operational descriptions matching with the level of the familiarity of users to the machine operation.

In the above-described automated transaction apparatus according to the eighth aspect of this invention, the description display unit of the automated transaction apparatus according to the seventh aspect presents the descriptive display by increasing the detail level one by one upon every passage of the predetermined time in a continuous non-operation time.

Accordingly, when a user feels uncertain about the subsequent operations, the description of what should be manipulated is displayed in accordance with the time elapsed, so that it is possible to present guidance displays matching with the level of the familiarity of users to the machine operation.

In the above-described automated transaction apparatus according to the ninth aspect of this invention, the process controller causes the group display unit previously group display information to the screen of the display device based on an input made by a user via the input device and the internal state of the process controller for each associative information, and to display the display information on the screen of the display device group by group in a systematically organized form, causes the state display unit to previously display all input items and item input areas associated with the input items, as display information to the screen of the display device and to display input results from the input device one after another in the item input areas, causes the instruction display unit to display instruction information to request operations for all pieces of information to be manipulated now, on the screen of the display device in association with mode information of a hardware portion to be operated, and alters portions corresponding to results of display operations indicated by the instruction information, one after another, in cooperation with the hardware, and causes the description display unit to present a more detailed descriptive display of a content of an operation available at a time when a user has made no operation for a previously-set predetermined time, in association with at least a part of the display information of the content of the available operation.

Accordingly, the display information are systematically grouped for each associative information, all the input items to be input, their item input areas and already-input information are displayed on the screen, a plurality of operations to follow are displayed on the screen and the display state changes in accordance with the operations performed, detailed descriptions on the contents to be manipulated are displayed on the display screen when a user who is not well acquainted with the subsequent operations makes no operation for a predetermined time, it is possible for users to easily and adequately grasp the operation state during the transaction procedure, what should be input from now on and the current input situation, so that the users can surely perform the proper operations while understanding the current situation. This facilitates the operations of transaction procedures more and improves the operability.

BRIEF DESCRIPTION OF THE DRAWINGS

FIG. 15 is a diagram showing a different example of the screen display for explaining the operation of the ATM in FIG. 2;

FIG. 16 is a diagram showing a different example of the screen display for explaining the operation of the ATM in FIG. 2;

FIG. 17 is a diagram showing a different example of the screen display for explaining the operation of the ATM in FIG. 2;

FIG. 18 is a diagram showing a different example of the screen display for explaining the operation of the ATM in FIG. 2;

FIG. 19 is a diagram showing a different example of the screen display for explaining the operation of the ATM in FIG. 2;

FIG. 20 is a diagram showing a different example of the screen display for explaining the operation of the ATM in FIG. 2;

FIG. 21 is a diagram showing a different example of the screen display for explaining the operation of the ATM in FIG. 2;

FIG. 22 is a diagram showing a different example of the screen display for explaining the operation of the ATM in FIG. 2;

FIG. 23 is a diagram showing a different example of the screen display for explaining the operation of the ATM in FIG. 2;

FIG. 24 is a diagram showing a different example of the screen display for explaining the operation of the ATM in FIG. 2;

FIG. 27 is a diagram showing a different example of the screen display for explaining the operation of the ATM in FIG. 2;

FIG. 28 is a diagram showing a different example of the screen display for explaining the operation of the ATM in FIG. 2;

DETAILED DESCRIPTION OF THE PREFERRED EMBODIMENTS

Automated transaction apparatuses according to preferred embodiments of the present invention will now be described with reference to the accompanying drawings.

First Embodiment

Figure 1:
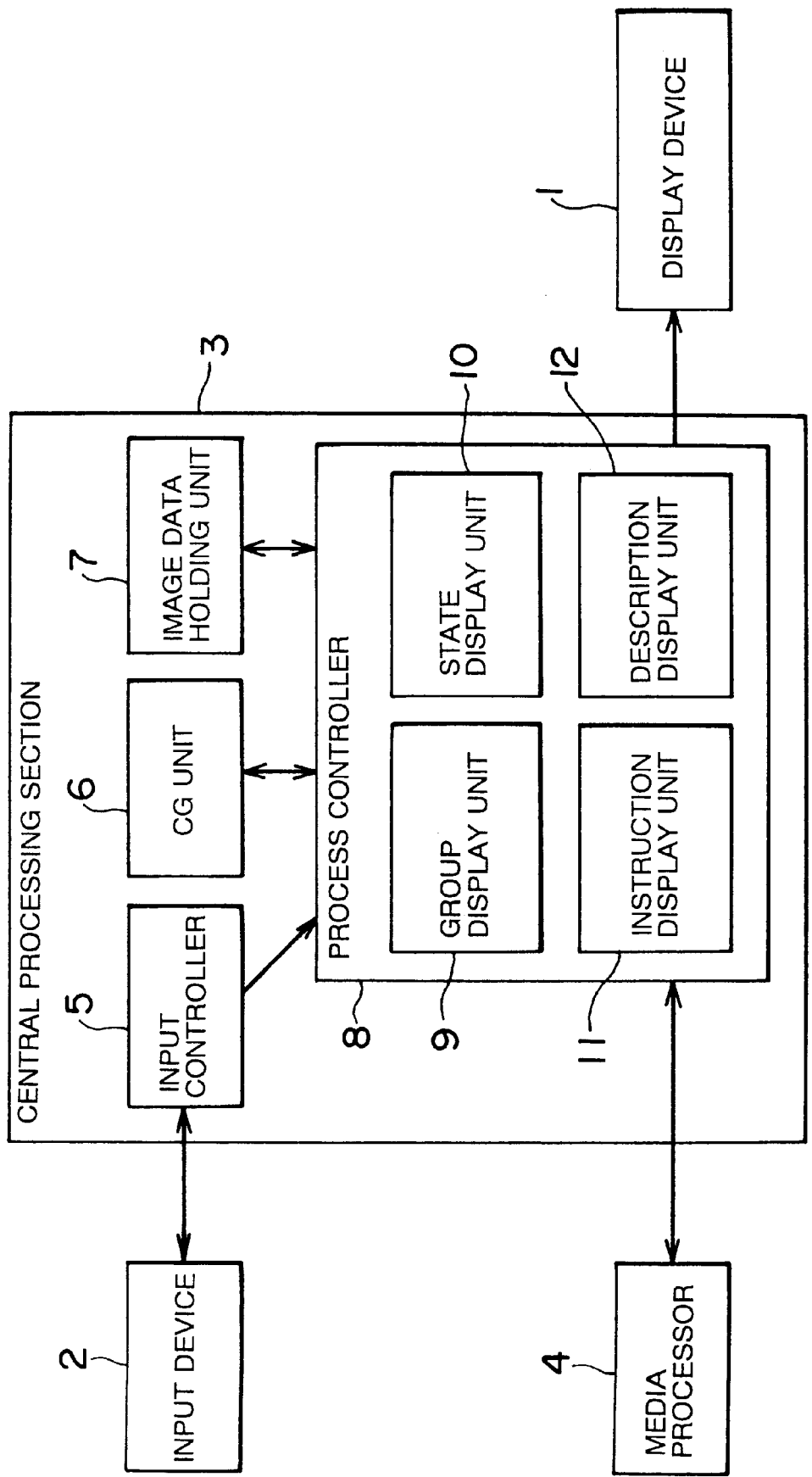
FIG. 1 is a block diagram showing the principle structure of an automated transaction apparatus according to a first embodiment of the present invention.

FIG. 1 shows the principle structure of an automated transaction apparatus according to the first embodiment of this invention.

The automated transaction apparatus shown in FIG. 1 has a display device 1, an input device 2, a central processing section 3 and a media processor 4.

The display device 1 displays information. The input device 2 inputs information about a transaction. The media processor 4 handles media, such as a magnetic card, a passbook, a slip and cashes.

The central processing section 3 includes, for example, an input controller 5, a CG unit 6, an image data holding unit 7 and a process controller 8.

The input controller 5 controls the input device 2 for the entry of information. The CG unit 6 has a character generator constituted of, for example, a ROM for storing character patterns necessary for the information display. Using the character patterns, the CG unit 6 generates character data forming display information such as a message displayed on the display device 1. Multiple pieces of image data for forming display screens to be displayed on the display device 1 are stored previously in the image data holding unit 7, so that desired image data is read from the image data holding unit 7 and is displayed, as needed. This image data may be displayed in combination with a character pattern generated by the CG unit 6 as needed.

The process controller 8 controls the information display of the display device 1 and perform a transaction procedure based on the information input from the input device 2 via the input controller 5. This process controller 8 has at least one of a group display unit 9, a state display unit 10, an instruction display unit 11 and a description display unit 12, for example.

An automated transaction apparatus equivalent to the first aspect of this invention comprises the display device 1, the input device 2, and the process controller 8, which has the group display unit 9. The group display unit 9 previously groups display information to the screen of the display device 1 based on an input made by a user via the input device 2 and the internal state of the process controller 8 for each associative information, and displays the display information on the screen of the display device 1 group by group in a systematically organized form. As a specific example of the systematic organization of the grouped display information for each associative information, the current state under operation is displayed based on the general classification by, for example, tabbed displays, and the image-oriented input format matching with the layout of an actual slip.

In an automated transaction apparatus equivalent to the second aspect of this invention, the process controller 8 of the automated transaction apparatus according to the first aspect further has the state display unit 10. The state display unit 10 previously displays all input items for the screen and item input areas associated with the input items, as display information to the screen of the display device 1 based on an input made by a user via the input device and the internal state of the process controller, and displays input results from the input device 2 one after another in the item input areas.

An automated transaction apparatus equivalent to the third aspect of this invention comprises the display device 1, the input device 2, and the process controller 8, which has the state display unit 10. The state display unit 10 previously displays all input items for the screen and item input areas associated with the input items, as display information to the screen of the display device 1 based on an input made by a user via the input device 2 and the internal state of the process controller 8, and displays input results from the input device 2 one after another in the item input areas.

An automated transaction apparatus equivalent to the fourth aspect of this invention comprises the display device 1, the input device 2, and the process controller 8, which has the instruction display unit 11. The instruction display unit 11 displays instruction information to request an operation on the screen of the display device 1 in association with mode information of a hardware portion to be operated, e.g., the media processor 4, based on the internal state of the process controller 8.

In an automated transaction apparatus equivalent to the fifth aspect of this invention, the instruction display unit 11 of the automated transaction apparatus according to the fourth aspect also displays instruction information to request operations for all pieces of information to be manipulated now, on the screen of the display device 1 in association with mode information of a hardware portion to be operated, and alters portions corresponding to results of display operations indicated by the instruction information, one after another, in cooperation with the hardware.

In an automated transaction apparatus equivalent to the sixth aspect of this invention, the instruction display unit 11 of the automated transaction apparatus according to the fifth aspect further also erases portions corresponding to results of display operations indicated by the instruction information, one after another, to alter display information to be displayed.

An automated transaction apparatus equivalent to the seventh aspect of this invention comprises the display device 1, the input device 2, and the process controller 8, which has the description display unit 12. Based on the internal state of the process controller 8, the description display unit 12 presents a more detailed descriptive display of the content of an operation available at a time when a user has made no operation for a previously-set predetermined time, in association with at least a part of the display information of the content of the available operation.

In an automated transaction apparatus equivalent to the eighth aspect of this invention, the description display unit 12 of the automated transaction apparatus according to the seventh aspect also sets a plurality of detail levels for the descriptive display and presents the descriptive display by increasing the detail level one by one upon every passage of the predetermined time in a continuous non-operation time.

An automated transaction apparatus equivalent to the ninth aspect of this invention comprises the display device 1, the input device 2, and the process controller 8, which has the group display unit 9, the state display unit 10, the instruction display unit 11 and the description display unit 12. The group display unit 9 previously groups display information to the screen of the display device 1 based on an input made by a user via the input device 2 and the internal state of the process controller 8 for each associative information, and displays the display information on the screen of the display device 1 group by group in a systematically organized form. The state display unit 10 previously displays all input items for the screen and item input areas associated with the input items, as display information to the screen of the display device 1 based on an input made by a user via the input device 2 and the internal state of the process controller 8, and displays input results from the input device one after another in the item input areas. The instruction display unit 11 displays instruction information to request operations for all pieces of information to be manipulated now, on the screen of the display device 1 in association with mode information of a hardware portion to be operated, and alters portions corresponding to the results of display operations indicated by the instruction information, one after another, in cooperation with the hardware. Based on the internal state of the process controller 8, the description display unit 12 presents a more detailed descriptive display of the content of an operation available at a time when a user has made no operation for a previously-set predetermined time, in association with at least a part of the display information of the content of the available operation.

According to the automated transaction apparatuses embodying this invention, the process controller 8 controls the information display of the display device 1, and performs a transaction procedure based on information input from the input device 2 via the input controller 5 in association with the information display.

In the above-described automated transaction apparatus equivalent to the first aspect of this invention, the process controller 8 causes the group display unit 9 to previously group display information to the screen of the display device 1 based on an input made by a user via the input device 2 and the internal state of the process controller 8 for each associative information, and to display the display information on the screen of the display device 1 group by group in a systematically organized form.

Accordingly, the display information are systematically grouped for each associative information, thus permitting users to easily grasp the operation state during the transaction procedure, so that the input style becomes easier and friendlier to the users.

In the above-described automated transaction apparatus equivalent to the second aspect of this invention, the process controller 8 of the automated transaction apparatus according to the first aspect further causes the state display unit 10 to previously display all input items and item input areas associated with the input items, as display information to the screen of the display device 1, and to display input results from the input device 2 one after another in the item input areas.

Accordingly, after the display information are systematically grouped for each associative information, all the input items to be input, their item input areas and already-input information are displayed on the screen, so that users can very easily grasp what should be input from now on and the current input situation.

In the above-described automated transaction apparatus equivalent to the third aspect of this invention, the process controller 8 causes the state display unit 10 to previously display all input items and item input areas associated with the input items, as display information to the screen of the display device 1, and to display input results from the input device 2 one after another in the item input areas.

Since all the input items to be input, their item input areas and already-input information are displayed on the screen, users can very easily and properly grasp what should be input from now on and the current input situation.

In the above-described automated transaction apparatus equivalent to the fourth aspect of this invention, the process controller 8 causes the instruction display unit 11 to display instruction information to request an operation on the screen of the display device 1 in association with mode information of a hardware portion to be operated.

As what operations should be performed thereafter is displayed on the screen, even users who have are not so certain about the subsequent operations can perform the operations properly.

In the above-described automated transaction apparatus equivalent to the fifth aspect of this invention, the instruction display unit 11 of the automated transaction apparatus according to the fourth aspect displays instruction information to request operations for all pieces of information to be manipulated now, on the screen of the display device 1, at the time of displaying the instruction information in association with mode information of a hardware portion to be operated, and alters portions corresponding to results of display operations indicated by the instruction information, one after another, in cooperation with the hardware.

Since a plurality of operations to follow are displayed on the screen and the display state changes in accordance with the operations performed, an operator or a user can surely perform the proper operations while grasping the situation.

In the automated transaction apparatus equivalent to the sixth aspect of this invention, the instruction display unit 11 of the automated transaction apparatus according to the fifth aspect erases portions of the instruction information, displayed on the screen of the display device 1 to request operations for all pieces of information to be manipulated now, which correspond to the results of display operations indicated by the instruction information, one after another, in cooperation with the hardware.

Since a plurality of operations to follow are displayed on the screen and instruction information which becomes unnecessary in accordance with the operations performed is erased and only the necessary instruction information is displayed, users can properly perform the operations while grasping the situation.

In the above-described automated transaction apparatus equivalent to the seventh aspect of this invention, the process controller 8 causes the description display unit 12 to present, based on the internal state of the process controller 8, a more detailed descriptive display of the content of an operation available at a time when a user has made no operation for a predetermined time, in association with at least a part of the display information of the content of the available operation.

Since detailed descriptions on the contents to be manipulated are displayed on the display screen when a user who is not well acquainted with the subsequent operations makes no operation for a predetermined time, it is possible to present better guidance displays with the operational descriptions matching with the level of the familiarity of users to the machine operation.

In the above-described automated transaction apparatus equivalent to the eighth aspect of this invention, the description display unit 12 of the automated transaction apparatus according to the seventh aspect presents the descriptive display by increasing the detail level one by one upon every passage of the predetermined time in a continuous non-operation time.

Accordingly, when a user feels uncertain about the subsequent operations, the description of what should be manipulated is displayed in accordance with the time elapsed, so that it is possible to present guidance displays matching with the level of the familiarity of users to the machine operation.

In the above-described automated transaction apparatus equivalent to the ninth aspect of this invention, the process controller 8 causes the group display unit 9 to previously group display information to the screen of the display device 1 based on an input made by a user via the input device 2 and the internal state of the process controller 8 for each associative information, and to display the display information on the screen of the display device 1 group by group in a systematically organized form, causes the state display unit 10 to previously display all input items and item input areas associated with the input items, as display information to the screen of the display device 1 and to display input results from the input device one after another in the item input areas, causes the instruction display unit 11 to display instruction information to request operations for all pieces of information to be manipulated now, on the screen of the display device 1 in association with mode information of a hardware portion to be operated, and alters portions corresponding to results of display operations indicated by the instruction information, one after another, in cooperation with the hardware, and causes the description display unit 12 to present a more detailed descriptive display of the content of an operation available at a time when a user has made no operation for a previously-set predetermined time, in association with at least a part of the display information of the content of the available operation.

Accordingly, the display information are systematically grouped for each associative information, all the input items to be input, their item input areas and already-input information are displayed on the screen, a plurality of operations to follow are displayed on the screen and the display state changes in accordance with the operations performed, and detailed descriptions on the contents to be manipulated are displayed on the display screen when a user who is not well acquainted with the subsequent operations makes no operation for a predetermined time. Therefore, it is possible for users to easily and adequately grasp the operation state during the transaction procedure, what should be input from now on and the current input situation, so that the users can surely perform the proper operations while understanding the current situation. This facilitates the operations of transaction procedures more and improves the operability.

Second Embodiment

Figure 2:
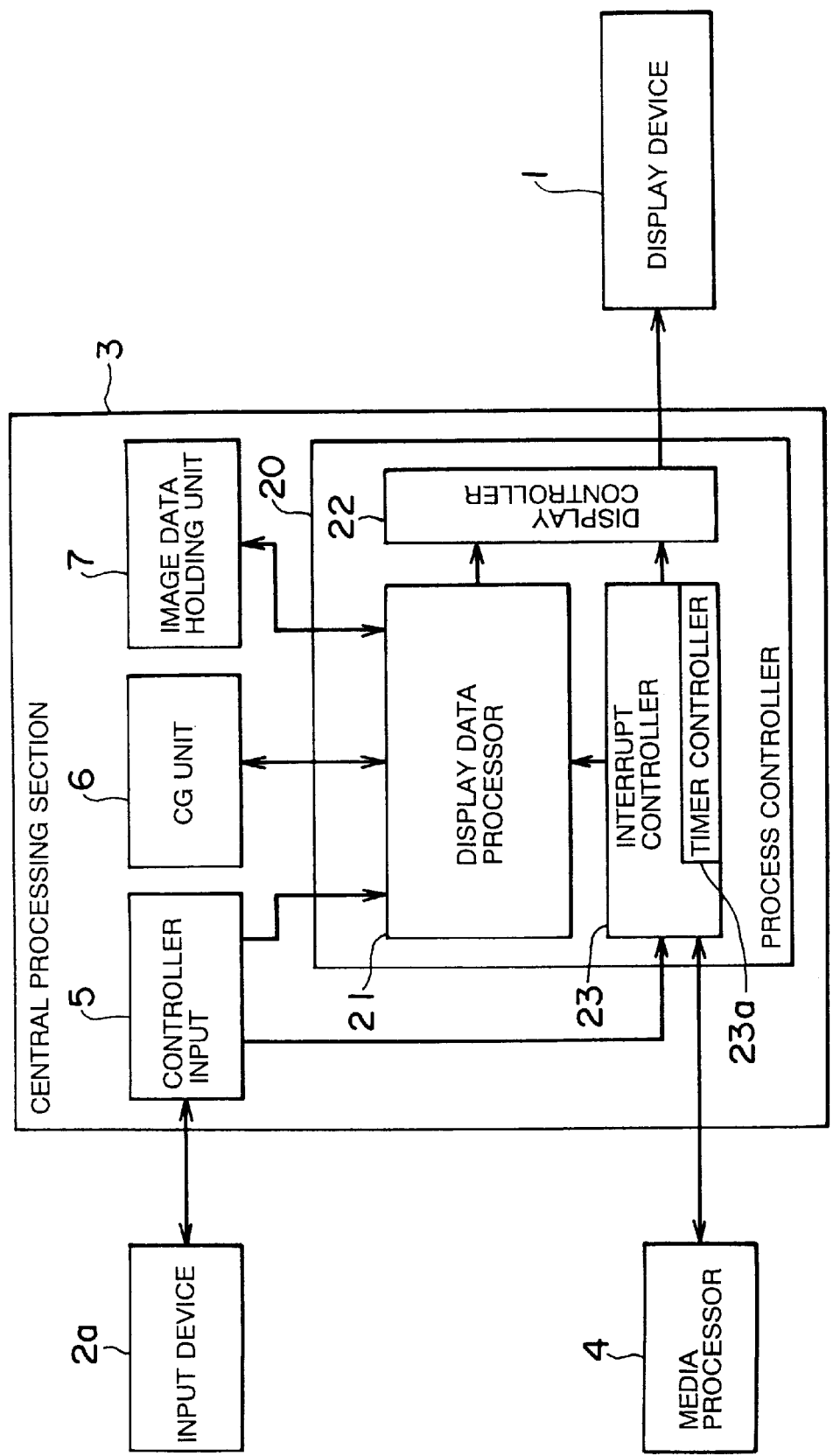
FIG. 2 is a block diagram showing the structures of the essential portions of an ATM according to a second embodiment of this invention.
Figure 3:
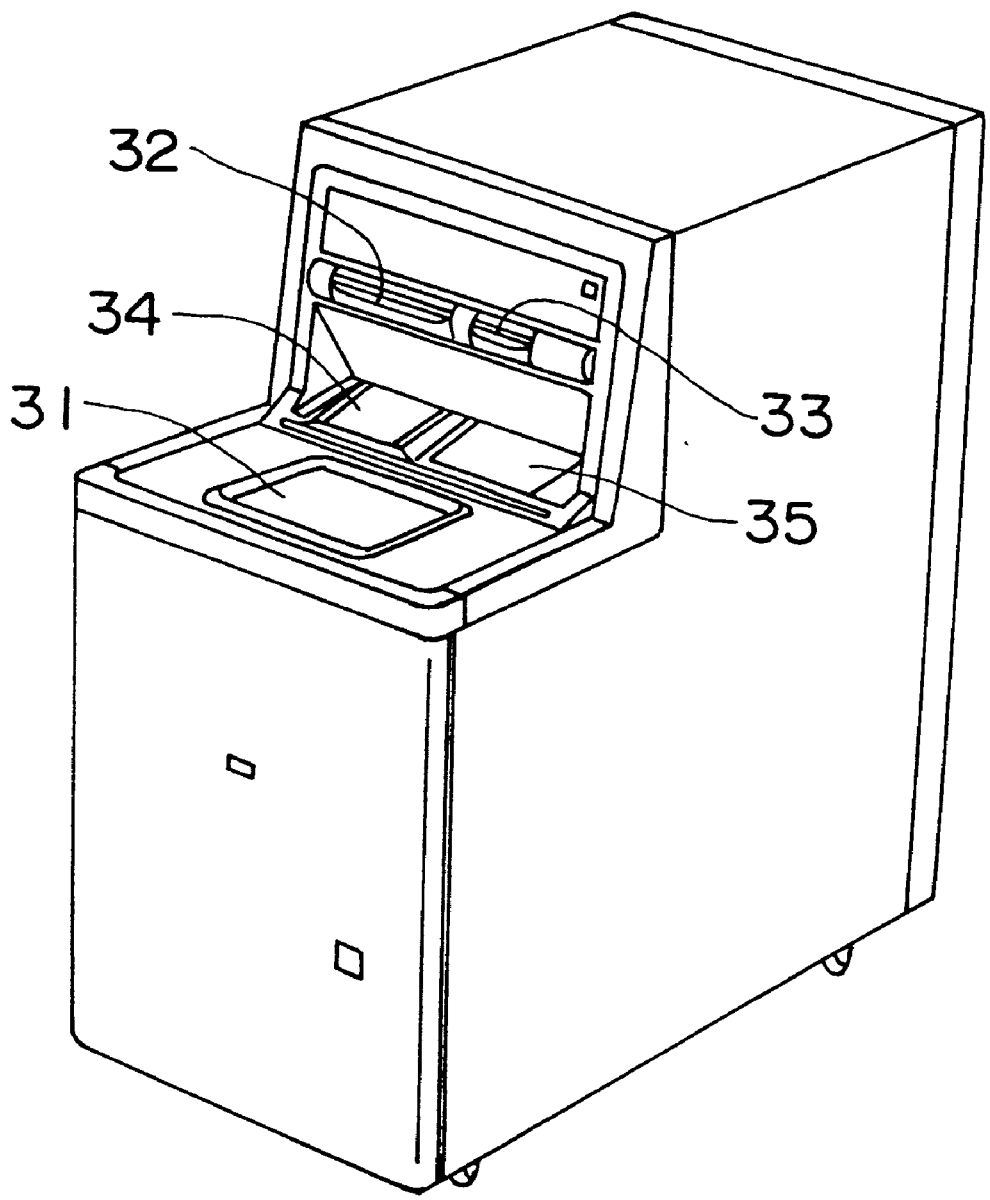
FIG. 3 is a perspective view showing the general structure of the ATM in FIG. 2.
Figure 4:
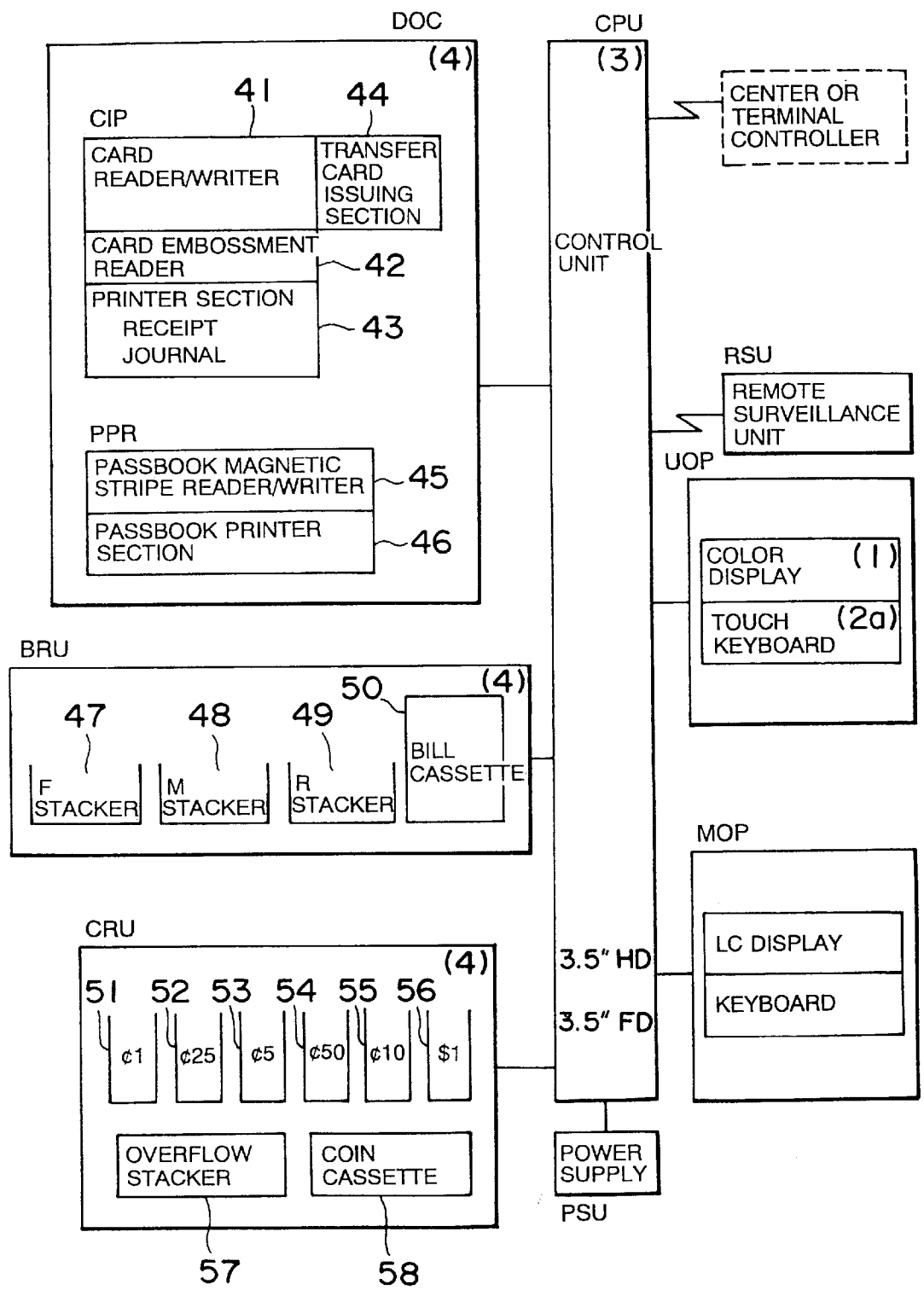
FIG. 4 is a diagram exemplarily showing the specific internal structure of the ATM in FIG. 2.

An ATM as an automated transaction apparatus according to the second embodiment will be described below with reference to FIGS. 2 through 31. FIGS. 2 to 4 illustrate the structure of the ATM, and use like or same reference numerals as used in FIG. 1 for components substantially identical to those in FIG. 1.

The ATM shown in FIG. 2 has a display device 1, an input device 2a, a central processing section 3 and a media processor 4.

The display device 1 displays information such as guidance messages using a CRT display or a liquid crystal display panel, for example. The input device 2a is constituted of a transparent flat switch provided over the display surface of the display device 1, and detects the position of the switch where an operator touches, thereby inputting the associated information. The media processor 4 handles media including a magnetic card, a passbook, a slip and cashes.

The central processing section 3 includes an input controller 5, a CG unit 6, an image data holding unit 7 and a process controller 20. The input controller 5 controls the input device 2 for the entry of information. The CG unit 6 has a character generator constituted of, for example, a ROM for storing character patterns necessary for the information display. The CG unit 6 generates character data forming display information like a message displayed on the display device 1. Multiple pieces of image data for forming display screens to be displayed on the display device 1 are stored previously in the image data holding unit 7, so that desired image data is read from the image data holding unit 7 and is displayed, as needed. This image data is displayed in combination with a character pattern generated by the CG unit 6 as needed. Further, only necessary portions of the image of the real apparatus, picked up by a pickup device like a video camera, may be extracted from the picked-up image and may be stored previously in the image data holding unit 7, whereby this image information can be read as image data from data holding unit 7 to be displayed on the display device 1, as needed.

The process controller 20 has a display data processor 21, a display controller 22 and an interrupt controller 23. This process controller 20 controls the information display of the display device 1 and performs transaction procedures in association with the display based on the information input from the input device 2a via the input controller 5. The process controller 20 functions mainly under the control of, for example, the software part of the central processing section 3 to perform the general process control. More specifically, the process controller 20 is constituted by, for example, a microprocessor unit.

The display data processor 21 generates display data to be displayed on the display device 1 based on information, such as input information, display character data, image data and an interrupt, obtained from the input controller 5, the CG unit 6, the image data holding unit 7 and the interrupt controller 23, and supplies the information to the display controller 22. Based on the display data from the display data processor 21, the display controller 22 controls the display device 1 to present a screen display according to this display data. The interrupt controller 23 has a timer controller 23a and executes an interrupt control to the display data processor 21 in response to the information from the input controller 5 and the media processor 4. This interrupt control permits a time-dependent guidance display or the like which will be discussed later.

The display data processor 21, the display controller 22 and the interrupt controller 23 of the process controller 20 interact to provide the functions of the above-described group display unit 9, state display unit 10, instruction display unit 11, and description display unit 12.

FIG. 3 shows the outline of the ATM which incorporates the above-described structure.

FIG. 3 shows the outline of the ATM and shows a display input section 31, a passbook slot 32, a card slot 33, a coin slot 34, and a bill slot 35 in this ATM.

The display input section 31 is constituted by the display surface of the display device 1 in this ATM and by arranging an input device like a touch sensor on this display surface to allow a user to input information by touching it. The passbook slot 32 is provided for the insertion and removal of a passbook, and the card slot 33 is provided for the insertion and removal of a card and a slip. The coin slot 34 is provided for the insertion and removal of coins, and the bill slot 35 is provided for the insertion and removal of bills.

FIG. 4 shows the specific structure of the ATM.

FIG. 4 illustrates a bond output and card read/write unit DOC, a bill recycle unit BRU, a coin recycle unit CRU, a user operation unit UOP, a management operation unit MOP, a control unit CPU and a power supply unit PSU.

The control unit CPU is substantially equivalent to the central processing section 3 in FIG. 2. The control unit CPU is connected to the host computer in the center via a transmission path like a communications line. Alternatively, the control unit CPU may be connected to a terminal controller to which a plurality of terminals are connected via transmission paths like communications lines, whereby the control unit CPU is connected to the host computer in the center via this terminal controller. The ATM communicates with the center and proceeds with a transaction while updating a book or a file where the balance of each user and transaction log are stored.

Also connected via a transmission path like a communications line to the control unit CPU is a remote surveillance unit RSU which performs the remote surveillance of the state of the ATM sited particularly in a branch, an unmanned shop (where only an ATM is placed) or the like. The remote surveillance unit RSU can monitor a plurality of ATMs and prevent problems, find a problem, attend it, and maintain the ATMs.

The bond output and card read/write unit DOC, bill recycle unit BRU and coil recycle unit CRU are equivalent to the media processor 4 in FIG. 2.

The bond output and card read/write unit DOC has a card reader/writer.image reader.printer section CIP, and a passbook printer section PPR.

The card read/write.image reader.printer section CIP includes a card reader/writer 41, a card embossment reader 42, a printer section 43 and a transfer card issuing section 44.

The card reader/writer 41 reads information, such as the account number and branch number in the magnetic stripe on the card inserted in the card slot 33 for some transaction, and writes data in the magnetic stripe as needed. The card embossment reader 42 reads the name, account number, etc. in the embossed portion of the card inserted in the card slot 33 as an image. The printer section 43 prints the account number read from the card, a transaction amount, etc. on a receipt, outputs the receipt through the card slot 33, and leaves the same data as printed on the receipt as a backup or journal of printed information in the apparatus. The transfer card issuing section 44 writes transfer information, such as the payee's name, in the magnetic stripe at the back of a transfer card which is used for the transfer transaction, prints necessary information in the blank portion on the surface of the card, and issues the transfer card. This transfer card is also output from the card slot 33.

The passbook printer section PPR has a passbook magnetic stripe reader/writer 45 and a passbook printer section 46.

The passbook magnetic stripe reader/writer 45 reads and writes information from and on the magnetic stripe of the passbook inserted in the passbook slot 32, for example. The passbook printer section 46 prints the transaction log on the passbook.

The bill recycle unit BRU has, for example, three stackers 47, 48 and 49, and a bill cassette 50, and handles bills.

Of the three stackers 47–49, the stacker 47 holds 1-dollar bills, the stacker 48 holds 10-dollar bills and the stacker 49 holds 100-dollar bills, for example. In executing a withdrawal transaction, a specified amount of money is paid out through the bill slot 35 from the stackers 47–49. In executing a deposit transaction, bills inserted through the bill slot 35 are stored on the stackers 47–49 for the respective types of bills. It is assumed that 5-dollar bills, 20-dollar bills and 50-dollar bills are collected on a collection-only stacker (not shown). Further, the three stackers 47–49 exchange bills with the detachable bill cassette 50 as needed. More specifically, when even one of the three stackers 47–49 becomes short of bills due to consecutive withdrawal transactions, bills are supplemented to that stacker from the bill cassette 50, and when even one of the three stackers 47–49 becomes full of bills due to consecutive deposit transactions, bills are transferred to the bill cassette 50 from that stacker.

The coin recycle unit CRU has stackers 51, 52, 53, 54, 55 and 56 for respective coins, an overflow stacker 57 and a coin cassette 58, and handles coins. When coins should be paid out due to a transaction requiring coins, such as a withdrawal transaction or a transfer transaction, the necessary number of coins in the necessary amount are paid out through the coin slot 34 from the respective stackers 51–56. When coins are placed in the coin slot 34, those coins are stored on the respective stackers 51–56 type by type. When coins in any of the stackers 51–56 become short due to consecutive payout of coins, the coins in short are supplemented to that stacker from the coin cassette 58. When coins in any of the stackers 51–56 overflow are received on the overflow stacker 57. The overflow stacker 57 and the coin cassette 58 are detachable and are used for coin supplement and coin removal.

The user operation unit UOP has a color display device 59 as the display device 1 and a touch keyboard 60 comprising a touchpanel, as the input device 2a, placed over the display surface of the display device 59. That is, the display surface of the color display device 59 and the touch keyboard 60 constitute the display input section 31 in FIG. 3.

The management operation unit MOP has an liquid crystal (LC) display 61 and a keyboard 62. The management operation unit MOP, like the remote surveillance unit RSU, can grasp the internal state of the ATM and perform the necessary maintenance.

The operation of the thus constituted ATM will be described with reference to flowcharts shown in FIGS. 5 and 6 and examples of the display screen shown in FIGS. 7 through 30.

Figure 5:
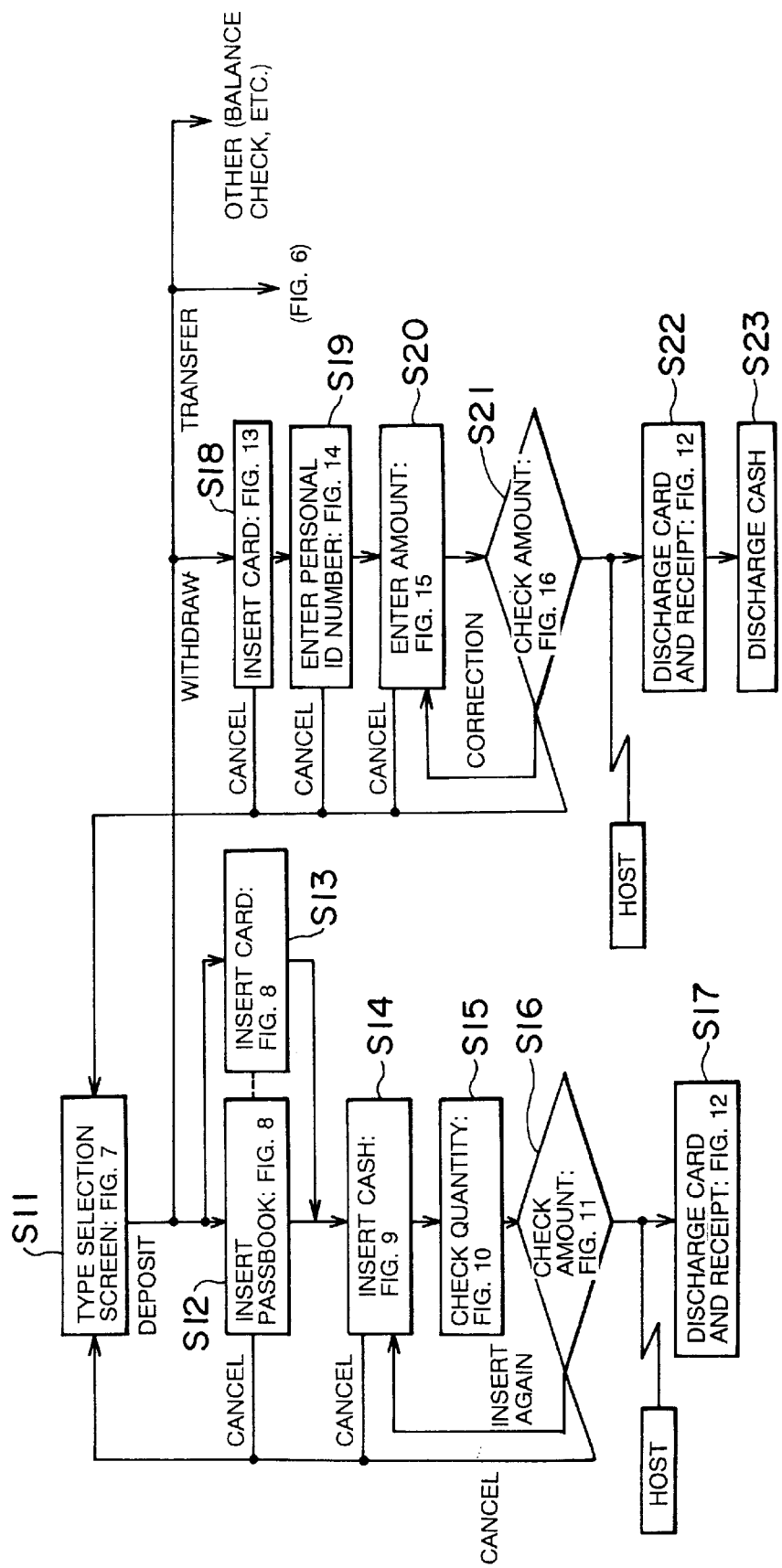
FIG. 5 is a flowchart illustrating an operation of the ATM in FIG. 2.
Figure 7:
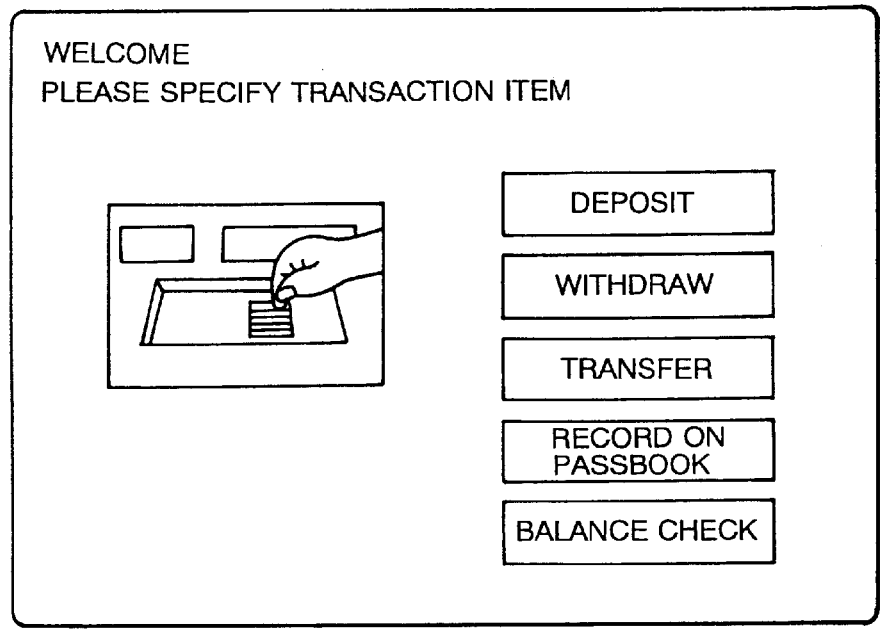
FIG. 7 is a diagram showing one example of the screen display for explaining the operation of the ATM in FIG. 2.

Referring to FIG. 5, in manipulating the ATM, first, a type selection screen as shown in FIG. 7 for selecting the type of a transaction item is displayed on the display device 1 (the color display device 59 of the user operation unit UOP), which constitutes the display input section 31, requesting a user to select one of "deposit," "withdrawal," "record on passbook" and "check balance" (step S11).

Figure 8:
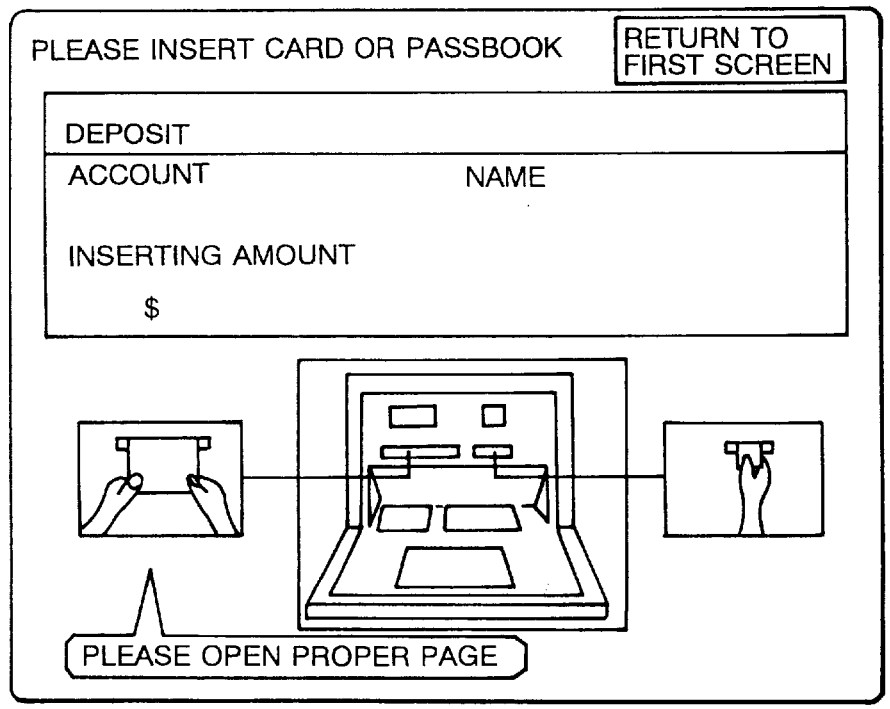
FIG. 8 is a diagram showing another example of the screen display for explaining the operation of the ATM in FIG. 2.
Figure 10:
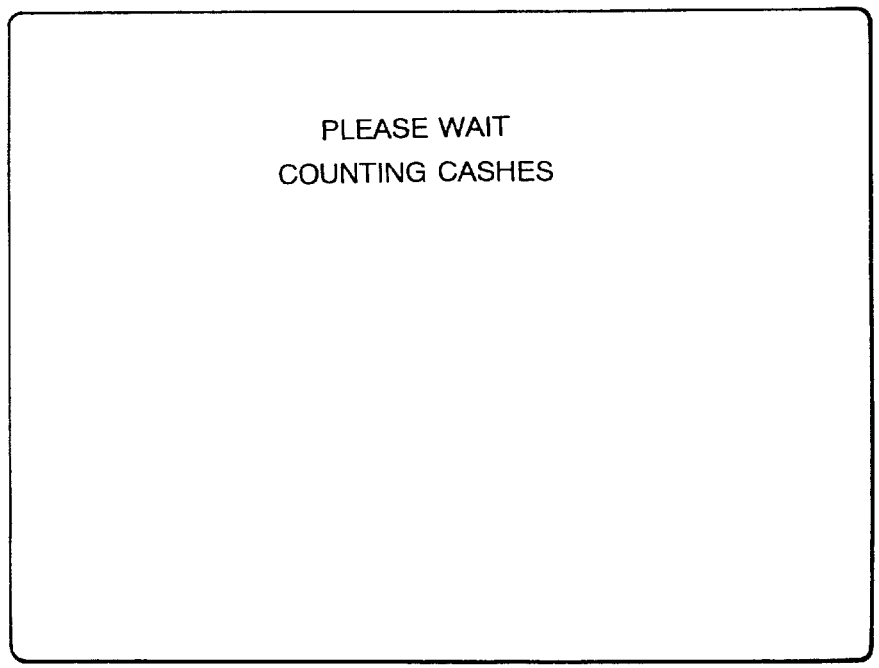
FIG. 10 is a diagram showing a different example of the screen display for explaining the operation of the ATM in FIG. 2.
Figures 11, 12:
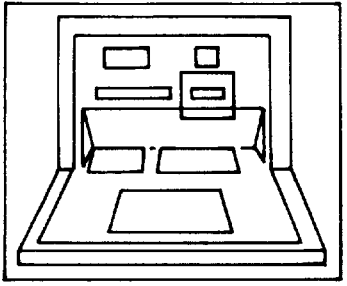
FIG. 11 is a diagram showing a different example of the screen display for explaining the operation of the ATM in FIG. 2.
FIG. 12 is a diagram showing a different example of the screen display for explaining the operation of the ATM in FIG. 2.

When a user selects the deposit transaction by operating the input device 2a (i.e., the touch keyboard 60 of the user operation unit UOP) constituting the display input section 31, the insertion of a passbook or a card is requested by the screen in FIG. 8, whereby the user inserts the passbook in the passbook slot 32 (step S12) or inserts the card in the card slot 33 (step S13). When the passbook is inserted in the passbook slot 32, the passbook printer PPR of the bond output and card read/write unit DOC processes the passbook. When the card is inserted in the card slot 33, the card read/write.image reader.printer section CIP of the bond output and card read/write unit DOC processes the card. As described earlier, this bond output and card read/write unit DOC is a part of the media processor 4. Then, the insertion of bills and/or coins is requested by the screen in FIG. 9 displayed on the display device 1. When the user inserts some bills in the bill slot 35 and/or coins in the coin slot 34 (step S14), the screen in FIG. 10 is displayed on the display device 1, the number of the inserted bills and/or the number of the inserted coins is checked by the bill recycle unit BRU and the coin recycle unit CRU, which are a part of the media processor 4 (step S15), and then the money check screen shown in FIG. 11 is displayed on the display device 1, requesting the user to confirm the amount (step S16). When the user acknowledges the amount by operating the input device 2a, the central processing section 3 or the control unit CPU communicates with the host machine to execute the deposit transaction on the book, the screen in FIG. 12 is displayed on the display device 1, and the card and receipt processed by the media processor 4 (specifically, the card read/write.image reader.printer section CIP of the bond output and card read/write unit DOC) are discharged through the card slot 33, requesting the user to remove them (step S17).

Figure 9:
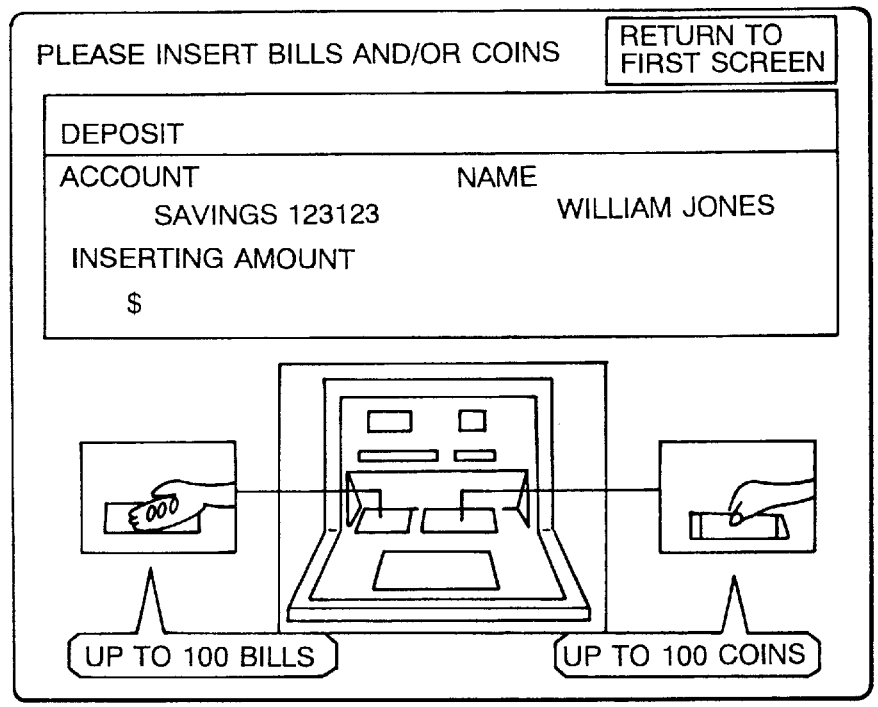
FIG. 9 is a diagram showing a further example of the screen display for explaining the operation of the ATM in FIG. 2.

When the process is canceled via the input device 2a by pressing a "Return to First Screen" key (displayed on the screens of the display device 1 as shown in FIGS. 8 and 9) or the like in each of steps S12 to S14, the screen returns the type selection screen in FIG. 7. When the process is canceled by pressing a "Insert Correction" key on the display screen (FIG. 11) to cancel the process in step S16, the screen returns to the bill/coin inserting screen (FIG. 9) in step S14. The "Return to First Screen" key is also located on the screen (FIG. 11) in step S16, so that when this key is pressed to cancel the process, the screen also returns to the type selection screen in FIG. 7.

Figure 13:
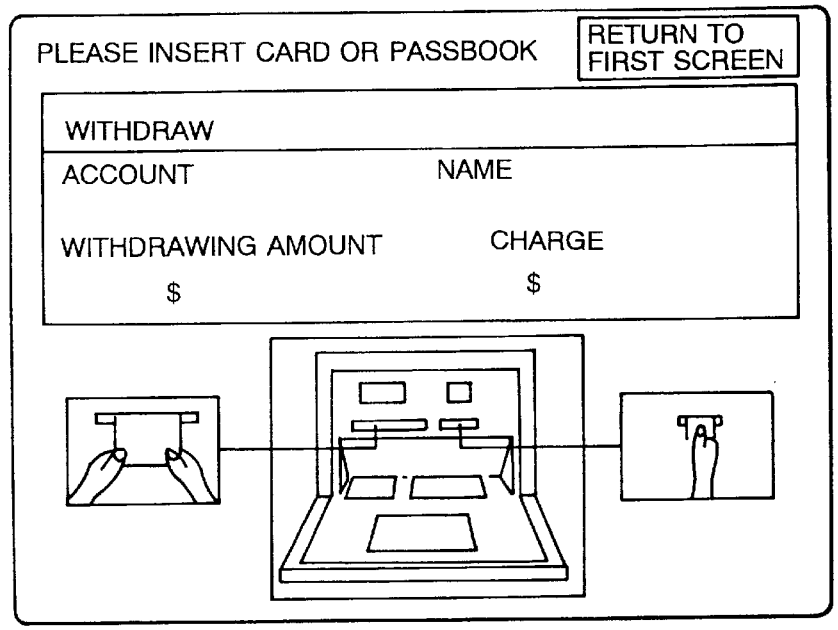
FIG. 13 is a diagram showing a different example of the screen display for explaining the operation of the ATM in FIG. 2.
Figure 14:
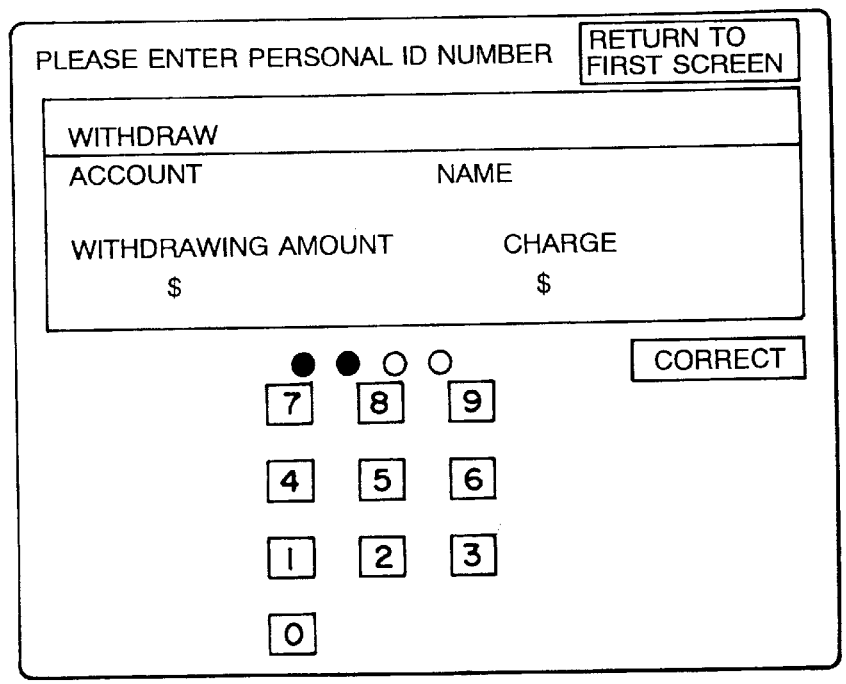
FIG. 14 is a diagram showing a different example of the screen display for explaining the operation of the ATM in FIG. 2.

When the user selects the withdrawal transaction on the type selection screen in FIG. 7 by operating the input device 2a, the screen in FIG. 13 is displayed on the display device 1, requesting the insertion of a card or a passbook. When the card or passbook is inserted in the card slot 33 or the passbook slot 32 (step S18), the screen in FIG. 14 is displayed, requesting the entry of a personal ID number, and the user inputs the personal ID number via the input device 2a by performing some operations on the screen of the display device 1 (step S19). For the entry of the personal ID number, the input digit position of the personal ID number is indicated on the screen by the combination of "●(entered)" and "0" (unentered) as shown in FIG. 14, for example. When the personal ID number is entered in step S19, the user is requested through the screen in FIG. 15 to input money so that the user inserts some money (step S20) and confirms the amount of the money displayed on the screen in FIG. 16 (step S21). When the amount is acknowledged in step S21, the central processing section 3 (the control unit CPU) communicates with the host machine, the screen in FIG. 12 is displayed, and the card and receipt processed by the media processor 4 (the card read/write.image reader.printer section CIP of the bond output and card read/write unit DOC) are discharged through the card slot 33, requesting the user to remove them (step S22). When the user removes the card and receipt, the media processor 4 (the bill recycle unit BRU and coin recycle unit CRU) performs the subsequent process to discharge cashes through the bill slot 35 and the coin slot 34, requesting the user to take the money (step S23). The user then takes the cashes.

When the process is canceled by pressing the "Return to First Screen" key or the like in each of steps S18 to S20, the screen returns the type selection screen in FIG. 7. When the process is canceled by pressing an "Amount Correction" key to cancel the process in step S21, the screen returns to the money inserting screen (FIG. 15) in step S20. The "Return to First Screen" key is also located on the screen (FIG. 16) in step S21, so that when this key is pressed to cancel the process, the screen also returns to the type selection screen in FIG. 7.

Figure 6:
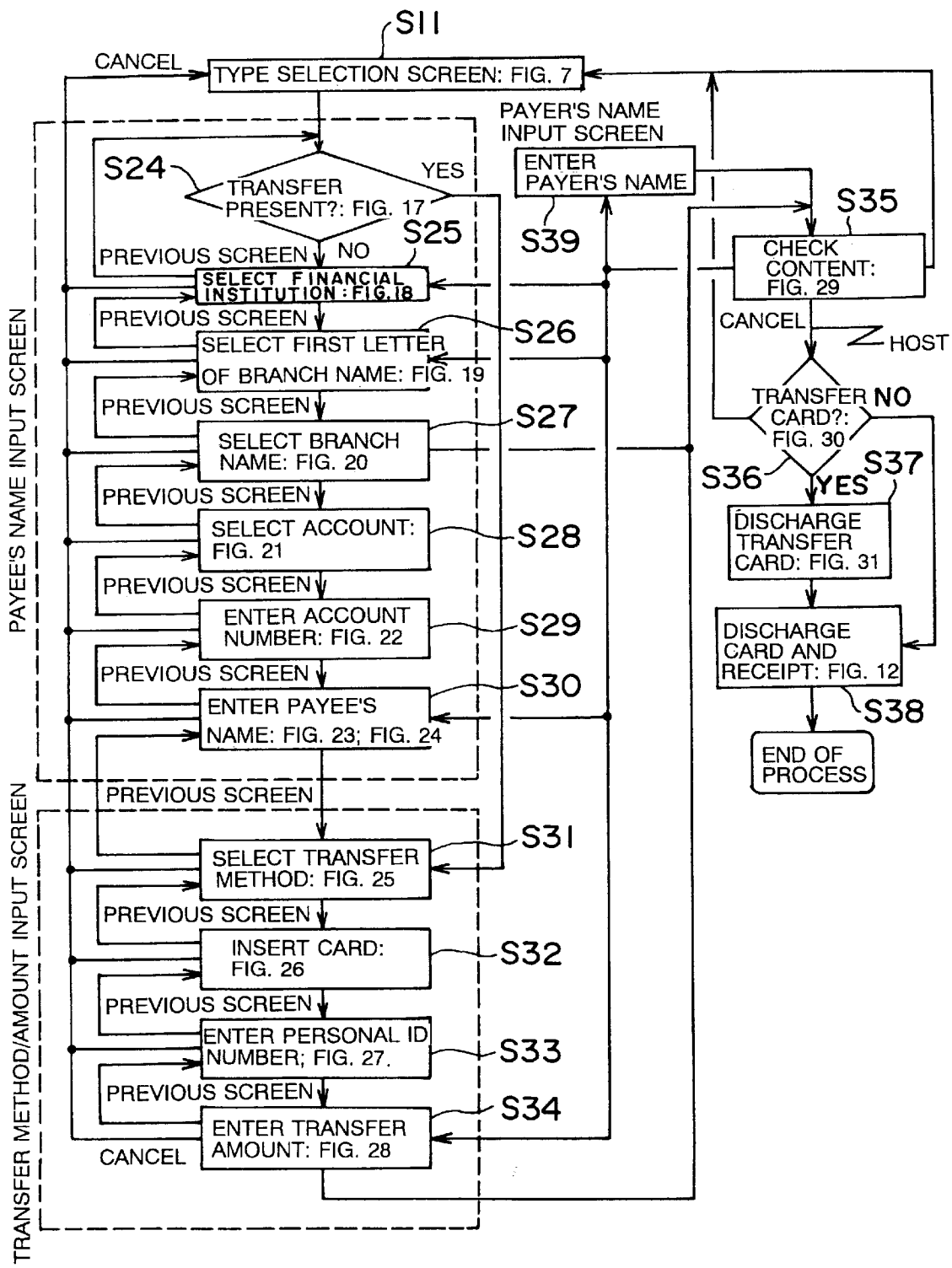
FIG. 6 is a flowchart illustrating an operation of the ATM in FIG. 2, associated with a transfer.

When the transfer is selected on the type selection screen in FIG. 7, the process enters a transfer transaction as illustrated in the flowchart in FIG. 6. The detailed description of the transfer transaction in FIG. 6 will be given later.

When another transaction like the balance check is selected on the type selection screen in FIG. 7, the selected process such as the balance check is performed; the details of the process in this case will not be given.

The details of the transfer transaction will be discussed below with reference to the flowchart in FIG. 6.

When the transfer is selected in the aforementioned step S11, the screen in FIG. 17 is displayed on the display device 1, requesting the user whether or not to use a transfer card (step S24). In this transfer transaction, the display data processor 21 and the display controller 22 of the process controller 20 shown in FIG. 2 perform a process equivalent to the function of the group display unit 11 in FIG. 1 to generate group-organized screens as shown in FIG. 17 and other drawings. The grouping process will be discussed shortly after. First comes the data input for a group for the payee's name input screen corresponding to tab 1.

When a new designation is selected (i.e., the user does not have the associated transfer card) in step S24, the screen in FIG. 18 showing a list of financial institutions as financial institutions keys is displayed on the display device 1, so that the user selects the financial institution of the payee via the input device 2a by performing some screen-based operations (step S25). When the financial institution is selected, the screen containing alphabet keys as sown in FIG. 19 is then displayed and the user selects the first letter of the branch name by the screen-based operation (step S26). When the first letter of the branch is selected, the screen showing a list of branch names having the selected first letter as branch name keys as shown in FIG. 20 and the user selects the target branch name (step S27). When the selection of the branch name is made, the screen in FIG. 21 is displayed next, requesting the user to select the type of the account, i.e., either a savings account or a checking account (step S28). When the account is designated, the screen in FIG. 22 is displayed next, requesting the entry of the account number (step S29). When the user enters the account number, the screen in FIG. 23 is then displayed, requesting the user to input the receiver's or payee's name (step S30).

The above-described steps S24 through S30 are input operations of the group for the payee's name input screen corresponding to tab 1.

Figure 25:
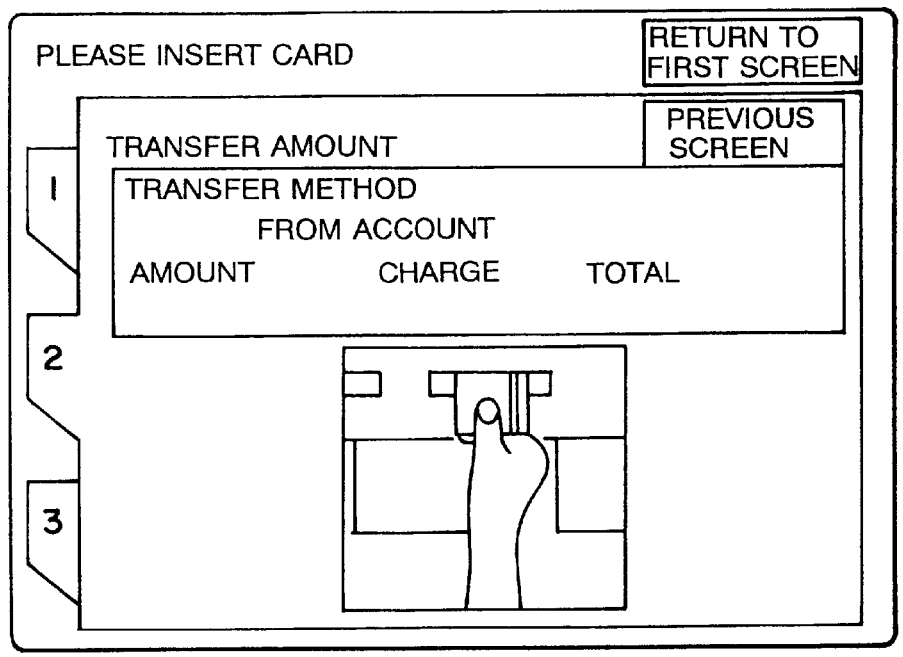
FIG. 25 is a diagram showing a different example of the screen display for explaining the operation of the ATM in FIG. 2.
Figure 26:
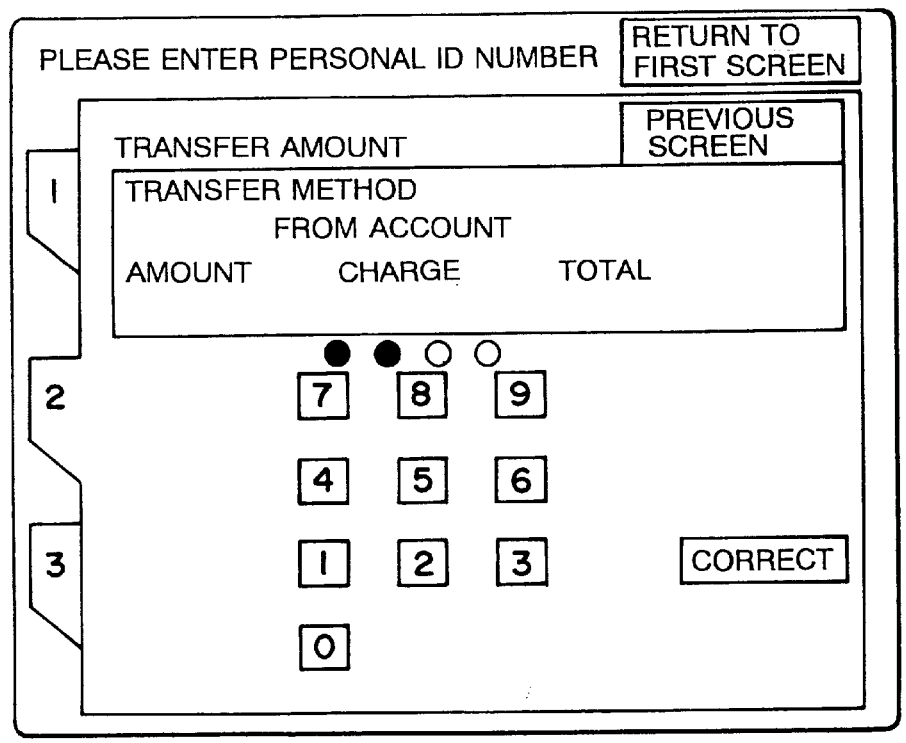
FIG. 26 is a diagram showing a different example of the screen display for explaining the operation of the ATM in FIG. 2.

After the entry of the payee's name comes the input operations for a group for the transfer method/amount input screen corresponding to tab 2. The screen in FIG. 24 is displayed on the display device 1, and the transfer method, a transfer from the account or a transfer by cashes, is selected (step S31). When the transfer method is selected on the screen in FIG. 24 via the input device 2a, the screen in FIG. 25 is displayed next, requesting the insertion of a card (step S32). When the card is inserted in the card slot 33, this card is processed by the media processor 4 and the screen in FIG. 26 is then displayed, requesting the input of the personal ID number by means of 10-keys on the screen (step S33). When the personal ID number is input, the screen in FIG. 27 is displayed and the transfer amount is input (step S34). The above-described steps S31 through S34 are input operations of the group for the transfer method/amount input screen corresponding to tab 1.

When the process is canceled by pressing the "Return to First Screen" key in each of steps S25 to S34, the screen returns the type selection screen in step S11. When a "Previous Screen" key is operated in any of steps S25 to S34, the process returns by one step.

When the use of the transfer card is specified in step S24, steps S25 to S30 are skipped to step S31.

Figure 29:
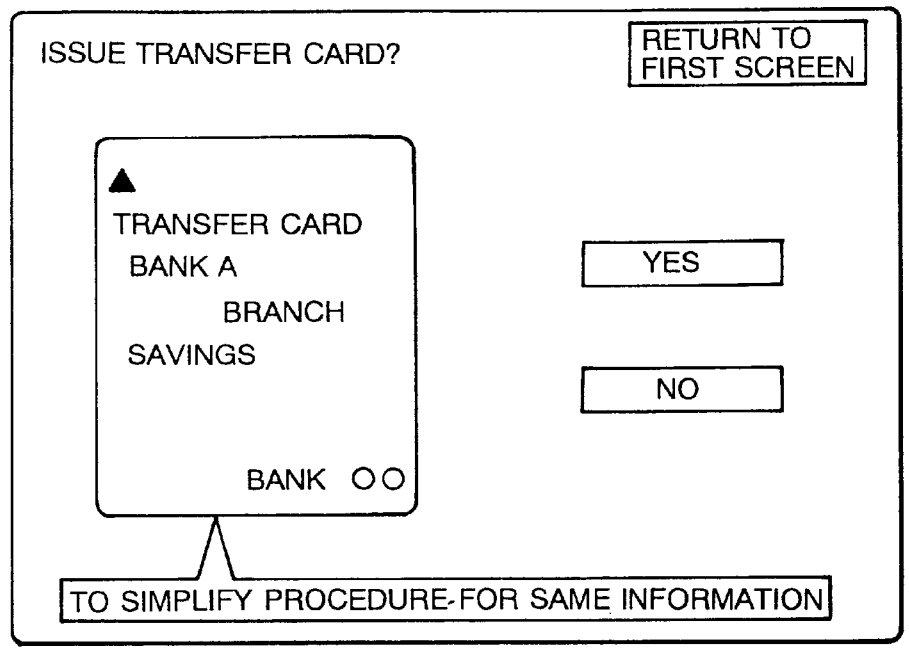
FIG. 29 is a diagram showing a different example of the screen display for explaining the operation of the ATM in FIG. 2.
Figure 30:
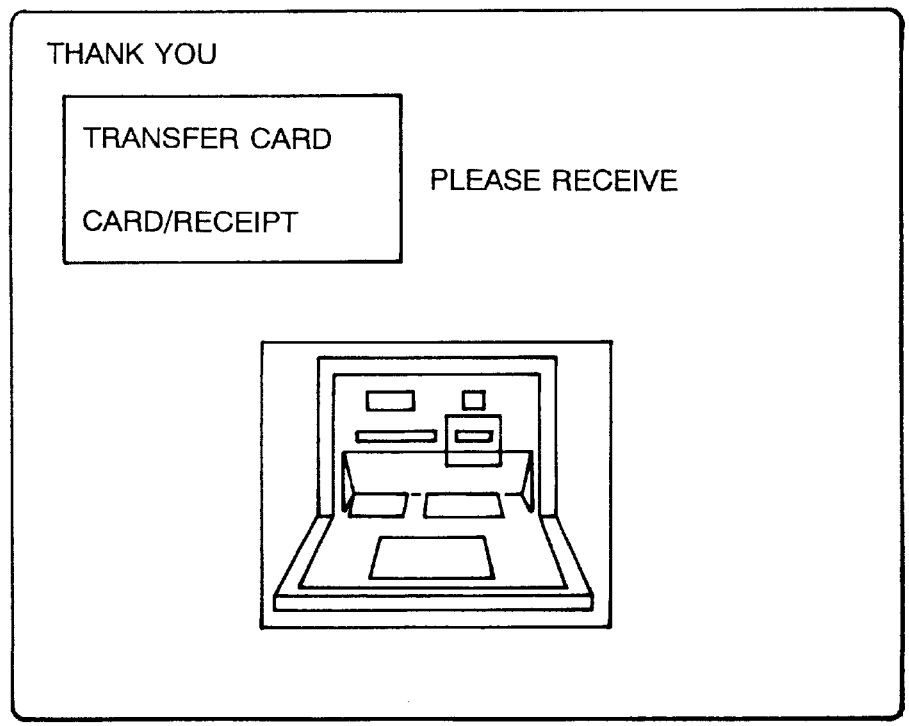
FIG. 30 is a diagram showing a different example of the screen display for explaining the operation of the ATM in FIG. 2.

When the transfer amount is input, the screen in FIG. 28 is displayed on the display device 1 and the user checks the contents of the transfer transaction (step S35). When the transfer contents are acknowledged in step S35 and the acknowledgement is given via the input device 2a, the central processing section 3 (control unit CPU) communicates with the host machine to execute the transfer transaction according to the input conditions, and the screen in FIG. 29 is displayed, asking the user to prepare a transfer card (step S36). If the user needs the transfer card, the user performs the necessary operation on the screen in FIG. 29 so that the screen in FIG. 30 is displayed. Next, the transfer card is produced by the media processor 4 and is then discharged from the card slot 33 (step S37). When the transfer card is removed from the card slot 33, the card and/or a receipt is then discharged from the same card slot 33 (step S38), completing the transfer transaction.

When no transfer card is needed in step S36, the process directly proceeds to step S38.

On the content checking screen in step S35, the financial institution, the branch name, the payee's name, the transfer amount and the like can be altered. When the alteration of any of the mentioned items is instructed, the process moves to the respective step S25, S26, S30 or S34. On the content checking screen in step S35, a change in the payer's name can be instructed. In this case, the payer's name is input (step S39). When the payer's name is entered, the process returns to step S35 for the reconfirmation of the transfer contents.

As described above, the conventional transfer procedures is separated into three general groups for the payee's name inputting screen, the transfer method/amount inputting screen and the payer's name inputting screen, the groups are tabbed as shown in FIGS. 17 and FIGS. 20–28, and their display colors and display shapes are changed to show the easily understandable progression of the whole transaction. The grouped displays and the display styles are accomplished by the display data processor 21 and the display controller 22 (equivalent to the group display unit 9 in FIG. 1). Of course, how to make the groups and the display styles may be modified in various other forms.

The above corresponds to the automated transaction apparatus according to the first aspect of this invention described earlier, wherein the interactive operations of the display data processor 21 and the display controller 22, which are equivalent to the function of the group display unit 9, present display information on the screen in a systematically organized form, group by group previously classified for each associative information. Accordingly, users can easily grasp the operation state during each transaction procedure, thus reducing the users' awkward feeling.

In this case, the transfer information are classified as follows.

(1) Payee's name
 [Tab 1]:
 Financial institution (Step S25)
 Branch name (Step S26)
 Account no. (Step S29)
 Name (Step S30)
(2) Transfer method/Amount
 [Tab 2]:
 Transfer method (Step S31)
 Amount (Step S34)
(3) Payer's name
 [Tab 3]:
 Name (Step S39)

Since the input items on the whole input screen are arranged in nearly the same manner as the conventional design of a transfer slip as shown in the content check screen in FIG. 28, for example, even users who are not well acquainted with the ATM can easily grasp the items to be input and the contents of the input items.

Since all the items to be input on the input screen and already-input information are displayed one after another on the screen, users can easily grasp the state and progress of the input operation.

The above corresponds to the automated transaction apparatus according to the second aspect of this invention described earlier, wherein the operation equivalent to the function of the state display unit 10 is added to the interactive operations of the display data processor 21 and the display controller 22, which are equivalent to the function of the group display unit 9, so that at the time of displaying information grouped for each associative information, all the input items and item input areas corresponding to the already-input items are displayed previously to reflect the input results on the item input areas one after another. This can permit users to more easily grasp the contents of information to be input thereafter and the current input situation.

The previous displaying of all the input items and item input areas corresponding to the already-input items previously and the reflection of the input results on the item input areas one after another are effective in improving the operability regardless of the contents of the display information.

The above corresponds to the automated transaction apparatus according to the third aspect of this invention described earlier, wherein the interactive operations of the display data processor 21 and the display controller 22, which are equivalent to the function of the state display unit 10, previously display all the input items and item input areas associated with the input items and reflect the input results in the item input areas. Accordingly, users can easily grasp the items to be input thereafter and the current input situation.

The ATM according to the above-described embodiment has the following advantages.

The graphical display of the input status allows users to grasp the current step in the whole transaction procedure, thus making the complicated transaction procedure easier to understand.

As the items to be input are previously displayed, what should be input thereafter can be grasped beforehand and can also be checked any time by the aforementioned display style while inputting the information, thus ensuring easier and more understandable input operations.

The combination of the whole steps of the input operation and the input format display allow users to always better grasp the current situation in the complex operation.

By designing the input format so as to given an image of filling ordinary application slips as used at bank counters, not only the transition to the use of the automated transaction apparatus by users becomes smoother but also the user-friendliness of the apparatus is improved.

The ATM of this embodiment also has the following features.

The whole automated transaction apparatus and how to insert and remove media are graphically illustrated by arrow displays and highlighted displays as shown in FIGS. 7, 8, 9, 12, 25 and 30, any user can easily recognize them.

The above corresponds to the automated transaction apparatus according to the fourth aspect of this invention described earlier, wherein the interactive operations of the display data processor 21 and the display controller 22, which are equivalent to the function of the instruction display unit 11, display instruction information to request operations on the screen in association with the mode information of the hardware to be manipulated. Since how to perform the subsequent operations is graphically displayed on the screen, therefore, users can easily understand what to do next.

Those graphical instruction displays may be erased one by one by the interaction with hardware, such as the media processor 4, every time a user inserts the necessary medium and removes what should be removed. This allows the user to easily anticipate the next operation and easily see the current operational progress from the display screen and can effectively prevent the unintentional left-out of the media. The instruction displays in this case are accomplished by the display data processor 21 and the display controller 22.

The above corresponds to the automated transaction apparatus according to the fifth aspect of this invention described earlier, wherein at the time instruction information to request operations on the screen in association with the mode information of the hardware to be manipulated, the interactive operations of the display data processor 21 and the display controller 22, which are equivalent to the function of the instruction display unit 11, display instruction information to request operations for all pieces of information to be manipulated now, on the screen, and alters portions corresponding to results of display operations indicated by the instruction information, one after another, in cooperation with the hardware. Since a plurality of operations to follow are displayed on the screen and the display condition changes as the manipulation progresses, therefore, operators or users can easily understand the current situation and can surely perform the appropriate operations.

The alteration of the display information corresponding the operation conditions in this case may be accomplished simply by erasing the display information one after another.

The above corresponds to the automated transaction apparatus according to the sixth aspect of this invention described earlier, wherein at the time instruction information to request operations on the screen in association with the mode information of the hardware to be manipulated, the interactive operations of the display data processor 21 and the display controller 22, which are equivalent to the function of the instruction display unit 11, display instruction information to request operations for all pieces of information to be manipulated now, on the screen, and alters portions corresponding to results of display operations indicated by the instruction information, one after another, in cooperation with the hardware. Since a plurality of operations to follow are displayed on the screen and the operations already performed are erased as the manipulation progresses, therefore, operators or users can easily understand the current situation and can surely perform the appropriate operations.

More specifically, media to be discharged, such as a passbook, a card and a receipt, are displayed previously in the screen display for the prevention of the media left-out, as shown in FIGS. 12 and 30, and the corresponding graphical illustrations are given and the slots from which the media are to be discharged are highlighted. When the passbook is discharged, for example, the characters for the passbook is erased from the screen and the passbook slot is no longer highlighted.

The above features provide the following advantages.

The previous displaying of all the media to be discharged can allow users to grasp the overall operation, contributing to the elimination of the users' uncomfortableness about the operation and presenting easier and friendlier operation environments.

The displaying of all the media to be discharged makes users aware of the media, thus contributing to the prevention of the media left-out.

The graphical representation of the apparatus's outline and the insertion of media can provide smoother operational guidance, thus improving the operability.

In addition to the display of media to be discharged, the display of any discharged medium among such media may be erased and the indication of the slot for that media may also be erased from the illustrated image of the apparatus accordingly, so that better operational environments can be provided by the names of media to be discharged later and the graphical illustrations of the associated slots.

The ATM of this embodiment also has the following features.

The displays to request users to perform an operation the conventional simplified messages may be combined with a system for displaying guidance messages in balloons led out from operational items or operation positions as the non-operation time on the user side continues in the standby mode for any user's operation (when a predetermined time passes without any operation), as shown in FIGS. 8, 9, 11, 16, 17, 24 and 29. The balloon guidances help users read detailed guidances besides the simplified messages, thus resulting in simplified operations, shorter operation time and removing of the anxiety of users.

The above corresponds to the automated transaction apparatus according to the seventh aspect of this invention described earlier, wherein the interactive operations of the display data processor 21 and the display controller 22, which are equivalent to the function of the description display unit 12, can present a more detailed descriptive display of the content of an operation available at a time when a user has made no operation for a predetermined time, in association with at least a part of the display information of the content of the available operation. When a user who is not well acquainted with the subsequent operations makes no operation for a predetermined time, it is possible to present better guidance displays with the operational descriptions matching with the level of the familiarity of users to the machine operation.

Figure 31:
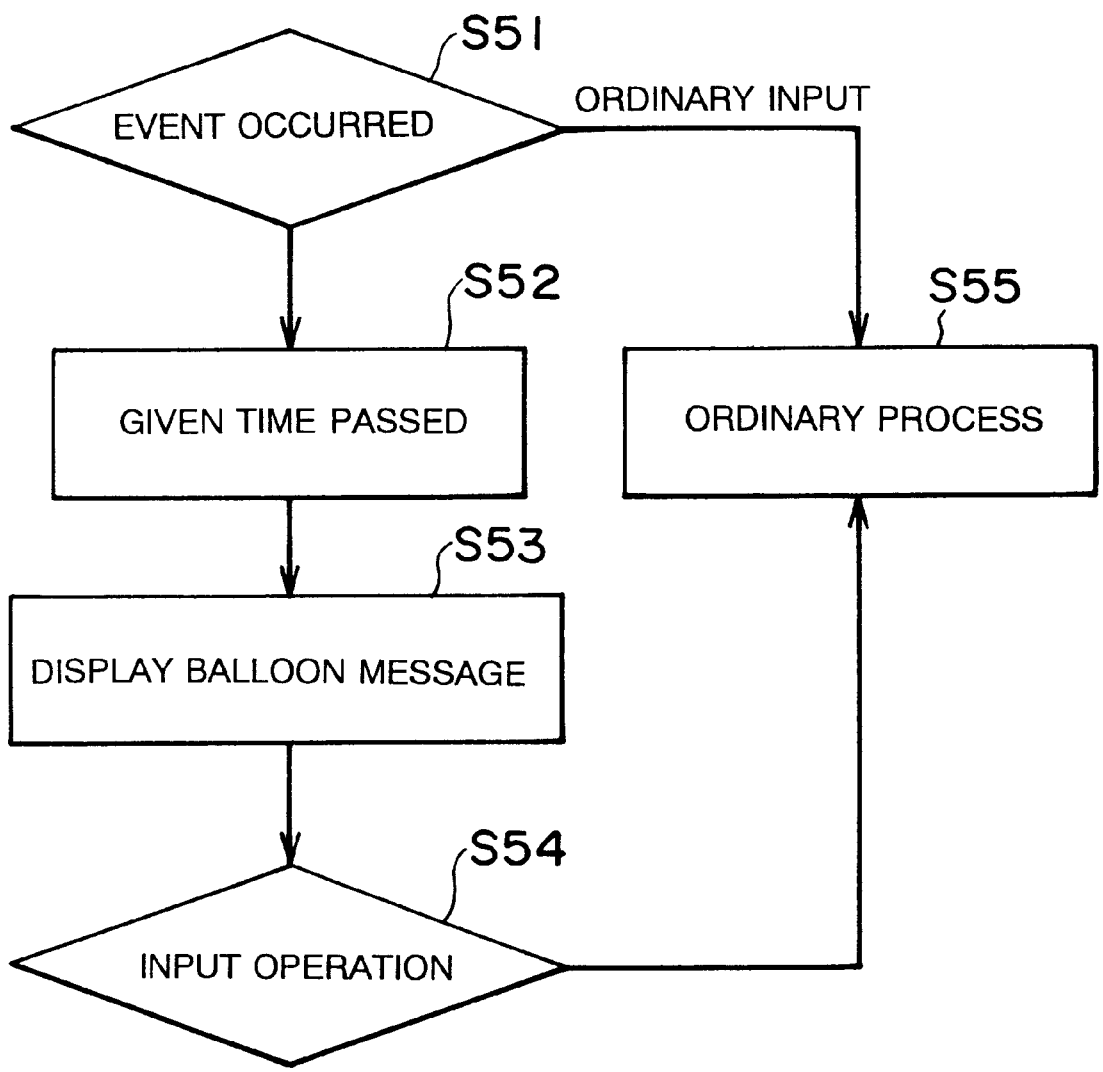
FIG. 31 is a flowchart for briefly explaining the balloon guidance display operation of the ATM in FIG. 2.

This descriptive display is presented as the display data processor 21 and the display controller 22 perform the process illustrated in the flowchart in FIG. 31 which is invoked by a timer interrupt issued by a timer controller 23a in the interrupt controller 23 in FIG. 2.

For example, when an event for the standby of an input occurs (step S51) and a given time passes without any operation (step S52), a balloon message is displayed (step S53). When an input operation is carried out thereafter, the process returns to the ordinary process (step S55). When an ordinary data input is made in response to the input standby event in step S51 before the given time passes, the process directly returns to the ordinary process and no balloon message is displayed.

In this case, if the given time is changed in accordance with the level of the difficulty in understanding balloon messages and detailed displays are presented level by level as the time passes, the guidance displays become more effective. For instance, a guidance display is given for the contents of an operation difficult to understand when the standby time is short, and a guidance display for the contents of items easier to understand is given when the non-operation time becomes longer.

The above corresponds to the automated transaction apparatus according to the eighth aspect of this invention described earlier, wherein when a user performs no operation for a predetermined time, the interactive operations of the display data processor 21 and the display controller 22, which are equivalent to the function of the description display unit 12, present the descriptive display by increasing the detail level one by one upon every passage of the predetermined time in the continuous non-operation time.

The above automated transaction apparatus has the following advantages.

By displaying balloon operation guidances which are difficult to understand merely with simplified messages or guidances indicating what to do, the anxiety and puzzlement on the user side can be reduced effectively.

As the individual operation guidances are displayed as the time passes, users who need help can read the balloon messages so as to be able to perform the operation smoothly, thus shortening the operation time per user.

As a balloon message is displayed where and when needed, users can perform the operation without worrying about it so that even one who is not well acquainted with the operation or who operates the machine for the first time can easily perform the input operation.

The style of the descriptive displays is not limited to the balloon type, but may be the combination of a message with just a lead line as long as messages can be associated with the items and where to operate.

Further, some of the above-described features may be combined effectively to constitute an ATM.

The above corresponds to the above-described automated transaction apparatus according to the ninth aspect of this invention. In this apparatus, the group display unit 9 previously groups display information to the screen based on an input made by a user and the internal state of the process controller 8 for each associative information, and displays the display information on the screen group by group in a systematically organized form, the state display unit 10 previously displays all input items and item input areas associated with the input items, as display information to the screen and displays input results from the input device one after another in the item input areas, the instruction display unit 11 displays instruction information to request operations for all pieces of information to be manipulated now, on the screen in association with mode information of a hardware portion to be operated, and alters portions corresponding to results of display operations indicated by the instruction information, one after another, in cooperation with the hardware, and the description display unit 12 presents a more detailed descriptive display of the content of an operation available at a time when a user has made no operation for a previously-set predetermined time, in association with at least a part of the display information of the content of the available operation. Accordingly, the display information are systematically grouped for each associative information, all the input items to be input, their item input areas and already-input information are displayed on the screen, a plurality of operations to follow are displayed on the screen and the display state changes in accordance with the operations performed, and detailed descriptions on the contents to be manipulated are displayed on the display screen when a user who is not well acquainted with the subsequent operations makes no operation for a predetermined time. It is therefore possible for users to easily and adequately grasp the operation state during the transaction procedure, what should be input from now on and the current input situation, so that the users can surely perform the proper operations while understanding the current situation. This facilitates the operations of transaction procedures more and improves the operability.

What is claimed is:

1. An automated transaction apparatus, comprising:

a display device to display visual information;

a console to receive operator input;

a process controller to execute a transaction procedure and to detect a response time of an operator of said console in association with at least part of the visual information; and a display controller to control said display device to display the visual information when the response time of the operator is less than a predetermined period of time and to display a detailed description of an executable operation when the response time of the operator exceeds the predetermined period of time.

2. The automated transaction apparatus according to claim 1, wherein said display controller has a plurality of detailed levels for the detailed description, and wherein said process controller instructs said display controller to control said display device to increase the detailed levels of the detailed description by one as the response time increases by multiples of the predetermined time.

3. An automated transaction apparatus, comprising:

a display device for displaying visual information;

a process controller for executing a transaction procedure;

a console to be operated by an operator to vary an internal state of said process controller;

a first display controller controlling said display device to display the visual information to show all operations to be operated at a time, and changing the visual information in accordance with operation results of said console by the operator;

a second display controller controlling said display device to display a detailed description of an executable operation at a time when no operation is performed for a predetermined time, in association with at least a part of the visual information of the executable operation;

a third display controller grouping previously the visual information based on an input made by the operator and the internal state of said process controller and controlling said display device to display the visual information group by group; and a fourth display controller controlling said display device to display previously all input items and input areas associated with the input items based on the input made by the operator and the internal state of said process controller, and to display inputs by the operator one after another in the input areas.

* * * * *